(12) United States Patent
Patel et al.

(10) Patent No.: US 7,197,433 B2
(45) Date of Patent: Mar. 27, 2007

(54) WORKLOAD PLACEMENT AMONG DATA CENTERS BASED ON THERMAL EFFICIENCY

(75) Inventors: Chandrakant D. Patel, Fremont, CA (US); Ratnesh K. Sharma, Union City, CA (US); Cullen E. Bash, San Francisco, CA (US); Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 10/820,786

(22) Filed: Apr. 9, 2004

(65) Prior Publication Data

US 2005/0228618 A1    Oct. 13, 2005

(51) Int. Cl.
*G06F 11/00* (2006.01)
*G06F 15/00* (2006.01)

(52) U.S. Cl. .................................. 702/188
(58) Field of Classification Search .............. 702/188
See application file for complete search history.

(56) References Cited

U.S. PATENT DOCUMENTS

| | | |
|---|---|---|
| 5,729,760 A | 3/1998 | Poisner |
| 5,796,984 A | 8/1998 | Pearce et al. |
| 6,209,083 B1 | 3/2001 | Naini et al. |
| 6,272,618 B1 | 8/2001 | Tyner et al. |
| 6,282,601 B1 | 8/2001 | Goodman et al. |
| 6,480,914 B1 | 11/2002 | Hsieh |
| 6,571,206 B1 | 5/2003 | Casano et al. |

(Continued)

FOREIGN PATENT DOCUMENTS

| | | |
|---|---|---|
| EP | 0996061 | 4/2000 |
| WO | WO0114961 | 3/2001 |

OTHER PUBLICATIONS

R.Buyya, "Economic-based distributed resource management and scheduling for grid computating", PHD Thesis ch 4, Apr. 12, 2002, PP 47-80, XP002351254, Melbourne Australia.

J Moore, et al, "A sense of place:Toward a location-aware information plane for data centers", Apr. 2, 2002, pp. 1-12, XP002351255.

(Continued)

*Primary Examiner*—Bryan Bui
*Assistant Examiner*—Adiya S. Bhat
(74) *Attorney, Agent, or Firm*—Richard P. Lange

(57) ABSTRACT

A system for workload placement among data centers includes a plurality of grid resource allocation managers (GRAMs), wherein the GRAMs are configured to obtain information from the data centers. The system also includes an information service configured to receive information from the plurality of GRAMs and a broker configured to receive an application request and to determine resource requirements from the application request, wherein the broker is configured to determine which of the data centers contains adequate resources to perform the requested application. The system further includes a co-allocator configured to receive information pertaining to the data centers having the adequate resources, wherein the co-allocator is further configured to select one of the data centers to perform the requested application based upon energy efficiency characteristics of the data centers.

46 Claims, 8 Drawing Sheets

U.S. PATENT DOCUMENTS

| | | |
|---|---|---|
| 6,636,962 B1 | 10/2003 | Sun et al. |
| 6,711,642 B2 | 3/2004 | Huang |
| 6,968,410 B2 | 11/2005 | Bennett et al. |
| 2002/0099893 A1 | 7/2002 | Nguyen et al. |
| 2003/0115024 A1* | 6/2003 | Snevely .......................... 703/1 |
| 2003/0158632 A1* | 8/2003 | Nierlich et al. ............. 700/295 |
| 2003/0193777 A1* | 10/2003 | Friedrich et al. ........... 361/687 |
| 2004/0240514 A1* | 12/2004 | Bash et al. ................. 374/109 |

OTHER PUBLICATIONS

S. Graupner, "Globus grid and firewalls:Issues and solutions in a utility data center environment", HP Labs technical report, Nov. 18, 2002, pp. 1-18, XP 002351256.

C. Patel, "Energy-aware grid: global workload placement based on energy efficiency", HP Labs technical report, Dec. 6, 2002, pp. 1-10, XP02351253.

* cited by examiner

WORKLOAD PLACEMENT AMONG DATA CENTERS BASED ON THERMAL EFFICIENCY

BACKGROUND OF THE INVENTION

A data center may be defined as a location, for instance, a room that houses computer systems arranged in a number of racks. A standard rack, for example, an electronics cabinet, is defined as an Electronics Industry Association (EIA) enclosure, 78 in. (2 meters) high, 24 in. (0.61 meter) wide and 30 in. (0.76 meter) deep. These racks are configured to house a number of computer systems, about forty (40) systems, with future configurations of racks being designed to accommodate 200 or more systems. The computer systems typically include a number of printed circuit boards (PCBs), mass storage devices, power supplies, processors, micro-controllers, and semi-conductor devices, that dissipate relatively significant amounts of heat during their operation. For example, a typical computer system comprising multiple microprocessors dissipates approximately 250 W of power. Thus, a rack containing forty (40) computer systems of this type dissipates approximately 10 KW of power.

The power required to transfer the heat dissipated by the components in the racks to the cool air contained in the data center is generally equal to about 10 percent of the power needed to operate the components. However, the power required to remove the heat dissipated by a plurality of racks in a data center is generally equal to about 50 percent of the power needed to operate the components in the racks. The disparity in the amount of power required to dissipate the various heat loads between racks and data centers stems from, for example, the additional thermodynamic work needed in the data center to cool the air. In one respect, racks are typically cooled with fans that operate to move cooling air across the heat dissipating components; whereas, data centers often implement reverse power cycles to cool heated return air. The additional work required to achieve the temperature reduction, in addition to the work associated with moving the cooling fluid in the data center and the condenser, often add up to the 50 percent power requirement. As such, the cooling of data centers presents problems in addition to those faced with the cooling of the racks.

Conventional data centers are typically cooled by operation of one or more air conditioning units. For example, compressors of air conditioning units typically consume a minimum of about thirty (30) percent of the required operating energy to sufficiently cool the data centers. The other components, for example, condensers and air movers (fans), typically consume an additional twenty (20) percent of the required total operating energy. As an example, a high density data center with 100 racks, each rack having a maximum power dissipation of 10 KW, generally requires 1 MW of cooling capacity. Air conditioning units with a capacity of 1 MW of heat removal generally requires a minimum of 300 KW input compressor power in addition to the power needed to drive the air moving devices, for instance, fans and blowers. Conventional data center air conditioning units do not vary their cooling fluid output based on the distributed needs of the data center. Instead, these air conditioning units generally operate at or near a maximum compressor power even when the heat load is reduced inside the data center.

The efficiencies at which the air conditioning units are able to cool the data centers are functions of the temperature of heat addition and the temperature of heat rejection (Carnot power cycle). The efficiency ($\eta$) of a classic Carnot power cycle is derived from the following equation:

$$\text{Equation 1:} \quad \eta = 1 - \frac{T_{heatrejection}}{T_{heataddition}}$$

As seen in the equation above, as the temperature of heat addition rises, the efficiency increases. The efficiency also increases as the temperature of heat rejection to the environment decreases.

A common type of heat extraction system employed in data centers includes reverse power cycle systems, which are also known as vapor-compression cycles. In reverse power cycle systems, heat addition occurs in the evaporator and heat rejection occurs in the condenser. A pressure (P)—enthalpy (h) diagram 600 depicting a typical vapor-compression cycle for heat rejection from data centers using R134a refrigerant is illustrated in FIG. 6A. In the diagram 600, heat addition ($Q_{evap}$) occurs in the evaporator (C-D), work input ($W_c$) occurs at the compressor (D-A), and heat rejection ($Q_{cond}$) occurs at the condensor (A-B). The processes C-D and A-B occur at constant temperatures and are referred as evaporator temperature ($T_{evap}$) and condenser temperature ($T_{cond}$), respectively.

Heat extraction from data centers occurs at the evaporators ($Q_{evap}$) of air conditioning units. Heat rejection occurs at the condensers ($Q_{cond}$) of the air conditioning units and is the sum of the compressor work ($W_c$) and the evaporator heat addition ($Q_{evap}$). The coefficient of performance (COP) of air conditioning units is the ratio of desired output ($Q_{evap}$) over the work input ($W_c$), that is:

$$\text{Equation 2:} \quad COP = \frac{Q_{evap}}{W_c}.$$

The COP of air conditioning units is improved by reducing the required compressor work ($W_c$) to provide the same amount of cooling (i.e., $Q_{evap}$). This is graphically illustrated in the COP versus condenser temperature ($T_{cond}$) plot 602 depicted in FIG. 6B. The COP results depicted in FIG. 6B are based on an evaporator temperature of 10° C. and a compressor isentropic efficiency of 60%. Because heat can only be rejected to the ambient surroundings over a negative temperature gradient, the ambient temperature gates the temperature of heat rejection to the external environment (i.e., condenser temperature). Accordingly, ambient temperatures place a theoretical limit on the maximum efficiency of data center air conditioning systems.

SUMMARY OF THE INVENTION

According to an embodiment, the present invention pertains to a system for workload placement among data centers. The system includes a plurality of grid resource allocation managers (GRAMs), wherein the GRAMs are configured to obtain information from the data centers. The system also includes an information service configured to receive information from the plurality of GRAMs and a broker configured to receive an application request and to determine resource requirements from the application request, wherein the broker is configured to determine which of the data centers contains adequate resources to perform the requested application. The system further includes a co-allocator configured to receive information pertaining to the data centers having the adequate resources, wherein the co-allocator is further configured to select one of the data centers to perform the requested application based upon energy efficiency characteristics of the data centers.

BRIEF DESCRIPTION OF THE DRAWINGS

Features of the present invention will become apparent to those skilled in the art from the following description with reference to the figures, in which.

DETAILED DESCRIPTION OF THE INVENTION

Figure 1:
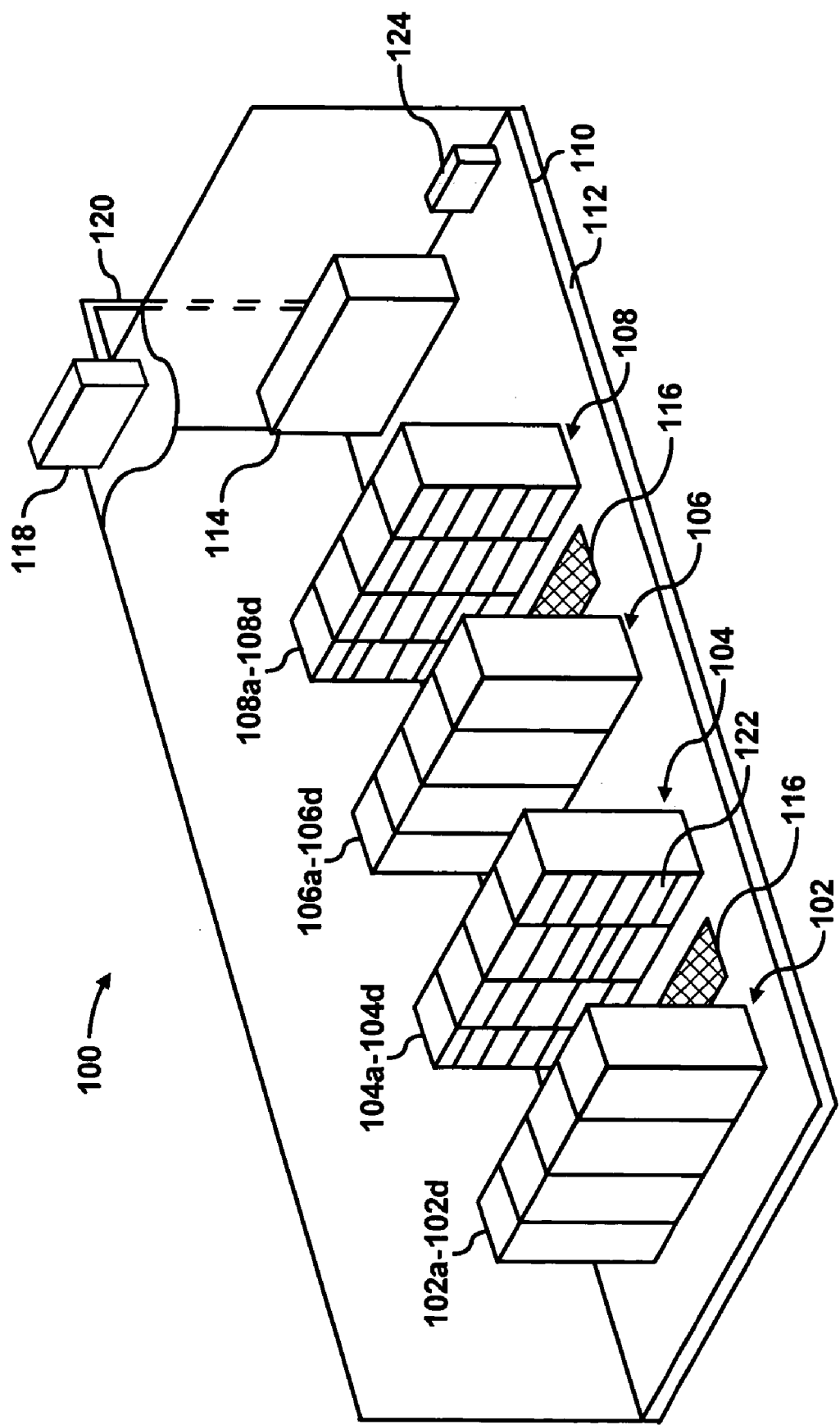
FIG. 1 shows a simplified perspective view of a data center, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Throughout the present disclosure, reference is made to "cooling fluid" and "heated cooling fluid". For purposes of simplicity, "cooling fluid" may generally be defined as air that has been cooled by a cooling device, for instance, an air conditioning unit. In addition, "heated cooling fluid" may generally be defined as cooling fluid that has been heated. It should be readily apparent, however, that the terms "cooling fluid" are not intended to denote air that only contains cooled fluid and that "heated cooling fluid" only contains cooling fluid that has been heated. Instead, embodiments of the invention may operate with air that contains a mixture of heated cooling fluid and cooling fluid. In addition, cooling fluid and heated cooling fluid may denote gases other than air, for instance, refrigerant and other types of gases known to those of ordinary skill in the art that may be used to cool electronic components.

A workload placement system bases resource allocation decisions among a plurality of data centers on various characteristics of the data centers. One of the characteristics includes the available resources (i.e., computer systems, processors, memories, servers, etc.) in the data centers. Another characteristic includes considerations based upon energy usage of the data centers. A further characteristic includes the efficiencies at which the data centers operate, for instance, in terms of energy usage for one or both of powering and cooling the resources.

In one example, the workload placement system may take advantage of the environmental conditions in which data centers are located in making resource allocation determinations. As discussed in the Background section, the ambient temperatures to which condensers reject heat affect the efficiencies at which heat is removed from data centers. In general, heat rejection from condensers increases with lower ambient temperatures, thereby increasing the efficiency of data center cooling systems. The workload placement system may select a data center to perform a requested application based upon the ambient conditions around the data center when the requested application is to be performed. Thus, for instance, because the ambient conditions may vary for various data center locations during various times of the year as well as during various times during each day, these factors may be considered by the workload placement system in selecting a data center to perform the requested application.

The data centers may contain resources for performing various applications and may be located at various geographic locations. For instance, the data centers may be located in various places, such as, different counties, states, or continents. The data centers may be associated with respective computer systems configured to operate as the resource allocation managers. More particularly, the computer systems may operate as one or both of local resource allocation managers and grid resource allocation managers. In terms of operating as local resource allocation managers, the computer systems may be configured to determine on which servers or other machines a requested application is performed. In operating as grid resource allocation managers, the computer systems may be configured to report their available resources to an information service designed to register the resources in the data centers.

The workload placement system includes a broker configured to make some of the workload placement decisions. More particularly, the broker is configured to query the information service to determine which data centers contain adequate resources to perform a computation or operation for a requested application. The adequate resources may include components capable of performing the requested application and sufficient resource instances to perform the requested application. If the broker determines that a single data center meets the criteria to perform the requested application, the broker may transmit an instruction to that data center to perform the requested application. However, if the broker determines that a number of data centers have adequate resources to perform the requested application, the identities of the qualifying data centers may be transmitted to an energy-aware co-allocator.

The energy-aware co-allocator may select a data center from the qualifying data centers to perform the requested application. The co-allocator may base this decision on the energy efficiencies of the data centers. More particularly, the co-allocator may select the data center having the highest energy efficiency. The energy efficiencies of the data centers may be classified as energy efficiency coefficients. The energy efficiency coefficients for the data centers may be determined in manners as described hereinbelow. In any respect, the co-allocator may select the data center having the highest energy efficiency coefficent to perform the workload or application.

Through implementation of various embodiments of the invention, a data center having a comparatively high energy efficiency may be selected to perform various applications. In one regard, therefore, the amount of energy required to perform various applications may be substantially optimized to thereby substantially minimize the costs associated with performing the various applications.

With reference first to FIG. 1, there is shown a simplified perspective view of an exemplary data center 100. The terms "data center" are generally meant to denote a room or other space and are not meant to limit the invention to any specific type of room where data is communicated or processed, nor should it be construed that use of the terms "data center" limits the invention in any respect other than its definition hereinabove.

The data center 100 depicted in FIG. 1 represents a generalized illustration and other components may be added or existing components may be removed or modified without departing from the scope of the invention. For example, the data center 100 may include any number of racks and various other apparatuses known to be housed in data centers. Thus, although the data center 100 is illustrated as containing four rows of racks 102–108 and a single CRAC unit 114, it should be understood that the data center 100 may include any number of racks, for instance, 100 racks, and CRAC units 114 without departing from the scope of the invention. The depiction of four rows of racks 102–108 and one CRAC unit 114 is thus for illustrative and simplicity of description purposes only and is not intended to limit the invention in any respect.

The data center 100 is depicted as having a plurality of racks 102–108, for instance, electronics cabinets, aligned in substantially parallel rows. The racks 102–108 are illustrated as having open front sides such that the components 122 housed therein are visible. It should, however, be understood that embodiments of the invention may be practiced with racks having panels that cover the front sides of the racks 102–108 without departing from a scope of the invention. The rows of racks 102–108 are shown as containing four racks (a–d) positioned on a raised floor 110. A plurality of wires and communication lines (not shown) may be located in a space 112 beneath the raised floor 110. The space 112 may also function as a plenum for delivery of cooling fluid from a computer room air conditioner (CRAC) unit 114 to the racks 102–108. The cooling fluid may be delivered from the space 112 to the racks 102–108 through vent tiles 116 located between some or all of the racks 102–108. The vent tiles 116 are shown in FIG. 1 as being located between racks 102 and 104 and 106 and 108.

The CRAC unit 114 is illustrated as being in communication with a rooftop condenser 118 through fluid lines 120. Although the condenser 118 is illustrated as a rooftop condenser, any reasonably suitable device capable of transferring heat to the external environment may be implemented without departing from a scope of the invention. For instance, therefore, cooling towers, evaporative coolers, heat exchangers, etc., may be employed in place of the condenser 118.

In one example, the CRAC unit 114 generally receives heated cooling fluid from the data center 100 and heat from the cooling fluid is absorbed by a refrigerant within the CRAC unit 114 through a conventional vapor compression cycle. In another example, the CRAC unit 114 includes a conventional chiller system configured to cool the heated cooling fluid. In any respect, the cooled cooling fluid is supplied into the space 112 and delivered to the racks 102–108 through the vent tiles 116. In a further example, the CRAC unit 114 may include components capable of varying the temperature and/or the volume flow rate of the cooling fluid delivered into the space 112 to thereby vary these characteristics of cooling fluid delivery to the racks 102–108. A more detailed description of the elements illustrated with respect to FIG. 1 along with manners in which the elements may be operated, may be found, for instance, in commonly assigned U.S. Pat. No. 6,574,104, filed on Oct. 5, 2001, which is hereby incorporated by reference in its entirety.

The racks 102–108 are generally configured to house a plurality of components 122, for instance, computers, servers, monitors, hard drives, disk drives, etc., designed to perform various operations, for instance, computing, switching, routing, displaying, etc. These components 122 may comprise subsystems (not shown), for example, processors, micro-controllers, high-speed video cards, memories, semi-conductor devices, and the like to perform these functions. In the performance of these electronic functions, the components 122, and therefore the subsystems, generally dissipate relatively large amounts of heat. Because the racks 102–108 have generally been known to include upwards of forty (40) or more subsystems, they may transfer substantially large amounts of heat to the cooling fluid to maintain the subsystems and the components 122 generally within predetermined operating temperature ranges.

A relatively small number of components 122 are illustrated as being housed in the racks 102–108 for purposes of simplicity. It should, however, be understood that the racks 102–108 may include any number of components 122, for instance, forty or more components 122, or 200 or more blade systems, without departing from the scope of the invention. In addition, although the racks 102–108 are illustrated as containing components 122 throughout the heights of the racks 102–108, it should be understood that some of the racks 102–108 may include slots or areas that do not include components 122 without departing from the scope of the invention.

Also illustrated in FIG. 1 is a computer system 124. The computer system 124 is generally configured to control various operations in the data center 100. For instance, the computer system 124 may be configured to control workload placement amongst the various components 122. As another example, the computer system 124 may be configured to control various operations of the CRAC unit 114 and the vent tiles 116, collectively considered as the cooling system. The cooling system also includes a plurality of sensors (not shown) configured to detect at least one environmental condition, for instance, temperature, pressure, humidity, etc. These sensors may comprise any reasonably suitable conventional sensors configured to detect one or more of these environmental conditions. The sensors may be positioned at various locations of the data center 100. The sensors may be positioned, for instance, to detect the temperature of the cooling fluid supplied by the CRAC unit 114, the temperatures of the cooling fluid at the inlets of various racks 102–108, the temperatures of the cooling fluid at the outlets of various racks 102–108, etc. The sensors may comprise devices separate from the components 122 or they may comprise devices integrated with the components 122.

As will be described in greater detail hereinbelow, the computer system 124 may also be configured to communicate with various devices through a network, for instance, the Internet. The various devices may be configured to receive information from the computer system 124. In addition, the computer system 124 may also be configured to receive information from the various devices.

Although the computer system 124 is illustrated as being separate from and located away from the racks 102–108, the computer system 124 may also comprise a server or other device housed in one of the racks 102–108 without deviating from a scope of the invention.

Figure 2A:
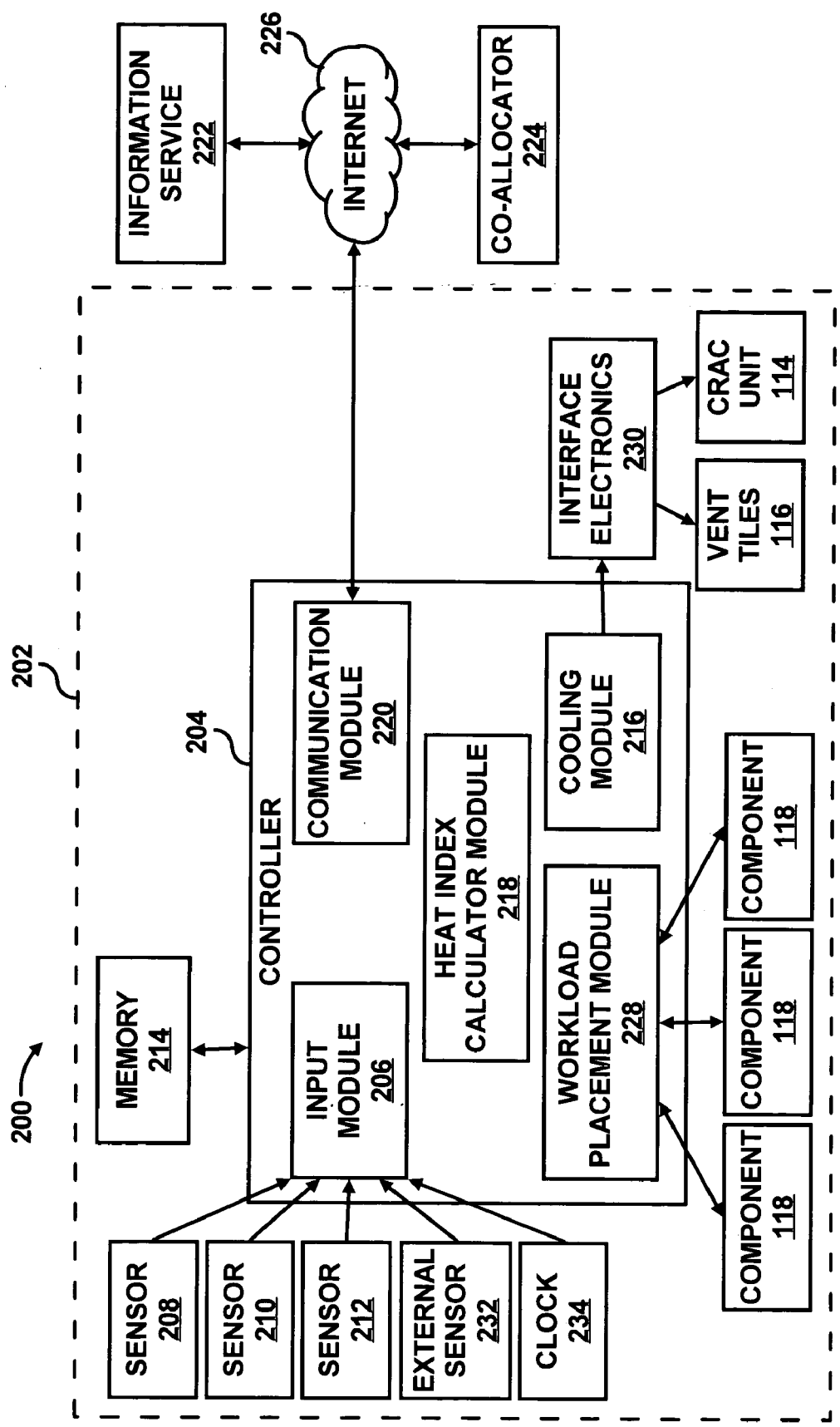
FIG. 2A is an exemplary block diagram of a workload placement system according to an embodiment of the invention.

FIG. 2A is an exemplary block diagram 200 of a workload placement system 202. It should be understood that the following description of the block diagram 200 is but one manner of a variety of different manners in which such a workload placement system 202 may be configured. In addition, it should be understood that the block diagram 200 may include additional components and that some of the components described herein may be removed and/or modified without departing from the scope of the invention. For instance, the block diagram 200 may include any number of sensors, servers, vent tiles, CRAC units, etc., as well as other components, which may be implemented in the operations of the workload placement system 202.

As shown, the workload placement system 202 includes a controller 204, which may be configured to control various components in the data center 100. In this regard, the controller 204 may comprise, for instance, the computer system 124 illustrated in FIG. 1. In addition, the controller 204 may comprise a microprocessor, a micro-controller, an application specific integrated circuit (ASIC), and the like. The controller 204 may operate as the local resource allocation manager for the data center 100. In addition, as described in greater detail hereinbelow, the controller 204 may also operate as a grid resource allocation manager.

The controller 204 is depicted as including an input module 206 configured to receive information from sensors 208–212. The input module 206 may include hardware and/or software configured to enable communications with the sensors 208–212 and may be configured based upon the manners of communication employed between the sensors 208–212 and the input module 206. The sensors 208–212 may comprise any reasonably suitable sensor configured to detect one or more environmental conditions, for instance, temperature, pressure, humidity, etc. In addition, the sensors 208–212 may be positioned at reasonably suitable location in the data center 100. Examples of suitable locations may include, for instance, the inlet and outlet of the CRAC unit 114, the outlets of the vent tiles 116, the inlets and outlets of the racks 102–108, etc. The sensors 208–212 may also comprise sensors that may be added to existing components or the sensors may be bundled or integrated with the components, for instance, components 122, CRAC unit 114, vent tiles 116, etc. In addition, although three sensors 208–212 are depicted in FIG. 2A, any number of sensors may be included in the system 202 without departing from a scope of the invention.

The controller 204 may receive information from the sensors 208–212 in any reasonably suitable wired or wireless manner. In this regard, for instance, information may be transmitted from the sensors 208–212 to the controller 204, and more particularly to the input module 206, via an Ethernet-type connection or through a wired protocol, such as IEEE 802.3, etc., or wireless protocols, such as IEEE 802.11b, 802.11g, wireless serial connection, Bluetooth, etc., or combinations thereof. The controller 204 may store the information received from the sensors 208–212 in a memory 214. The memory 214 may comprise a traditional memory device, such as, volatile or non-volatile memory, such as DRAM, EEPROM, flash memory, combinations thereof, and the like.

In one regard, a cooling module 216 of the controller 204 may receive the information received by the input module 206 from the sensors 208–212. Alternatively, the cooling module 216 may access the memory 214 to obtain the information. In any regard, the cooling module 216 may, for instance, be configured to determine how one or more of the CRAC unit 114 and the vent tiles 116 are to be manipulated in response to the received information. In addition, the cooling module 216 may be configured to operate the vent tiles 116 and/or the CRAC unit 114, for instance, in manners as described in commonly assigned and co-pending U.S. patent application Ser. No. 10/446,867 filed on May 29, 2003, the disclosure of which is hereby incorporated by reference in its entirety. By way of example, the cooling module 216 may be configured to increase the volume flow rate of cooling fluid delivered into the space 112 if the information indicates that additional cooling is required in the data center 100.

Control signals sent from the controller 204 to the vent tiles 116 and the CRAC unit 114 may be effectuated through use of interface electronics 230. In one regard, the interface electronics 230 may act as an interface between the controller 204 and various actuators (not shown) of the CRAC unit 114 and the vent tiles 116. By way of example, the interface electronics 230 may vary the voltage supplied to an actuator provided to actuate vanes in a vent tile 116 to thereby vary the opening in the vent tile 116.

According to another example, the controller 204 may include a heat index calculator module 218. The heat index calculator module 218 may be configured to receive information received by the input module 206 and calculate a heat index, which is a non-dimensional parameter that may be used to determine a scalable "index of performance". In addition, the index of performance may quantify the amount of re-circulation occurring at various locations of the data center 100. In this regard, the parameters are disclosed as a supply heat index (SHI) and a return heat index (RHI). The SHI and RHI may act as indicators of thermal management and energy efficiency of one or more components, a rack, a cluster of racks, or the data center 100 as a whole.

The SHI may be used to determine the level, if any, of heated cooling fluid re-circulation into the cooling fluid supplied to the racks 102–108 as disclosed and described in the Ser. No. 10/446,867 patent application. The disclosure of which is hereby incorporated by reference in its entirety. As discussed that in that application, the SHI may be calculated based upon temperatures measured at various locations throughout the data center 100. For example, the temperature of the cooling fluid supplied by the CRAC unit 114 as well as temperatures of the cooling fluid supplied to various racks 102–108 and the temperatures of the cooling fluid exhausted from the various racks 102–108 may be implemented to determine SHI. As further described in the Ser. No. 10/446,867 patent application, the SHI for a given rack may thus be determined as follows:

Equation 3: $SHI = \dfrac{T_{rockinlet} - T_{ref}}{T_{rockoutlet} - T_{ref}}$, where $T_{ref}$, $T_{rackinlet}$ and $T_{rackoutlet}$ denote the cooling fluid supply temperature to the space 112 and temperatures at a rack inlet and outlet, respectively.

The heat index calculator module 218 may further calculate a total SHI for the data center 100. By way of example, the heat index calculator module 218 may receive temperature information from sensors 208–212 variously positioned in the data center 100, in which some of the sensors 208–212 are configured to detect temperatures of cooling fluid supplied by different CRAC units 114 as well as at the inlets and outlets of racks 102–108 positioned in diverse locations of the data center 100. The heat index calculator module 218 may aggregate the calculated SHI's and formulate a data center 100 SHI. The aggregation of the calculated SHI's may include, for instance, determining a minimum SHI level, a maximum SHI level, an average SHI level, a mean SHI level, etc., for the data center 100. The heat index calculator module 218 may communicate one or more of the SHI levels to a communication module 220 of the controller 204. As will be described in greater detail hereinbelow, the communication module 220 may be configured to communicate with, for instance an information service 222 and a co-allocator 224. The communication may be effectuated through, for instance, the Internet 226. In this regard, the communication module 220 may include any reasonably suitable known hardware and/or software configured to effectuate communications between the controller 204 and the Internet 226.

As also illustrated in FIG. 2A, the controller 204 includes a workload placement module 228. The workload placement module 228 is generally configured to receive workload requests from, for instance, a user, a customer, another computer system, broker 256, co-allocator 224, etc., and to determine which of the components 122 are capable of performing the workload requests. In addition, the workload placement module 228 is configured to submit the workload request to the appropriate component(s) 122. In performing these functions, the workload placement module 228 may access information pertaining to the components 122, which may be stored in the memory 214. This information may include, for example, the various subsystems (for instance, processors, drivers, software, etc.) contained in the components 122, the current and scheduled workloads of the components 122, various performance characteristics of the components 122, energy consumption characteristics of the components 122, etc. In this regard, the controller 204 may operate as the local resource allocation manager for the data center 100.

The workload placement module 228 may also be in communication with the communication module 220. In one regard, the workload placement module 228 may be configured to transmit information pertaining to the components 122 to the communication module 220. The communication module 220 may also be configured to transmit this information to the information service 222 as will be described in greater detail hereinbelow. In general, the communication module 220 may function as a means for enabling communications between the controller 204 and, for instance, the information service 222.

The input module 206 may also receive information from an external sensor 232 and a clock 234. The external sensor 232 may be configured to detect one or more ambient conditions around the data center 100. The clock 234 may be configured to provide a current time to the input module 206. As described in greater detail hereinbelow, the ambient conditions and the time detected by the external sensor 232 and the clock 234, respectively, may be communicated to the information service 222 through the communication module 220.

The controller 204 may thus operate as a grid resource allocation manager, in that, the controller 204 may be configured to communicate data to the information service 222. In addition, the controller 204 may also receive instructions from the energy aware co-allocator 224 and form part of a large-scale workload placement system, as described hereinbelow with respect to FIG. 2B.

Figure 2B:
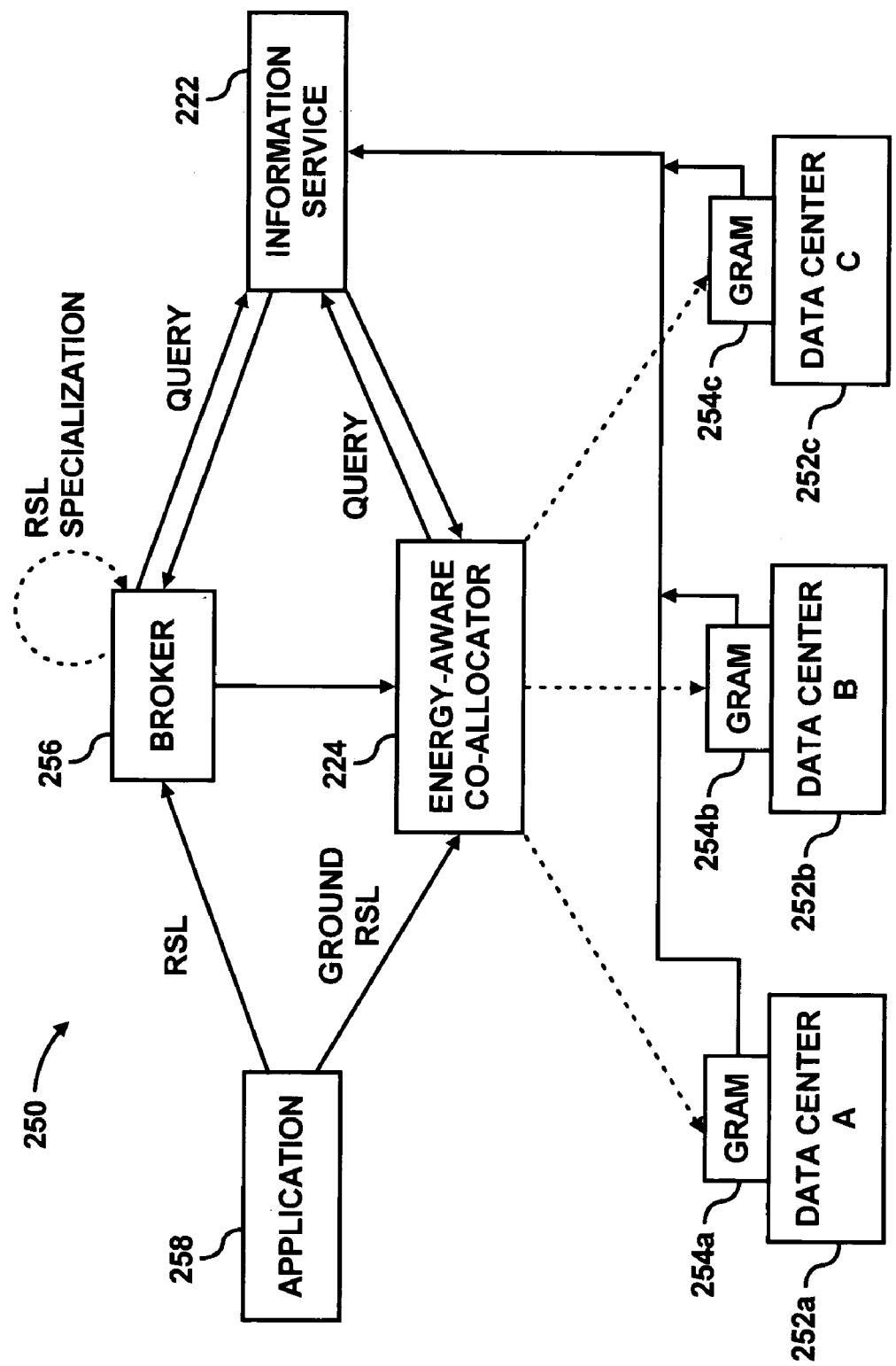
FIG. 2B is an exemplary block diagram of a large-scale workload placement system according to an embodiment of the invention.

FIG. 2B is an exemplary block diagram of a workload placement system 250 having a plurality of data centers 252a–252c. It should be understood that the following description of the WPS 250 is but one manner of a variety of different manners in which such a WPS 250 may be configured. In addition, it should be understood that the WPS 250 may include additional components and that some of the components described herein may be removed. and/or modified without departing from the scope of the invention. For instance, the WPS 250 may include any number of data centers, brokers, co-allocators, etc., as well other components, which may be implemented in the operations of the WPS 250.

As shown in FIG. 2B, the WPS 250 includes a plurality of data centers A-C 252a–252c, each of which may be configured as the data center 100 depicted in FIG. 1. In one regard, therefore, the data centers 252a–252c may include some or all of the elements described and illustrated hereinabove with respect to FIG. 1. In addition, the data centers 252a–252c may be located in relatively diverse geographic locations with respect to each other. The diverse geographic locations may include, for instance, locations in various counties of a particular State, different States, different countries, different continents, different time zones, etc. As another example, the geographic locations may be substantially based upon locations having different ambient conditions at different times. Thus, a data center, for instance, data center 252a may be located in the U.S. and another data center, for instance, data center 252b, may be located in India.

In addition, a grid resource allocation manager (GRAM) 254a–254c is illustrated as being associated with a respective data center 252a–252c. The GRAMs 254a–254c may comprise the computer system 124 and thus the controller 204 of the workload placement system 202. In this regard, the GRAMs 254a–254c may be configured to operate in manners as described hereinabove with respect to the computer system 124 and the controller 204. Alternatively, the GRAMs 254a–254c may comprise separate computing devices that may be configured to receive information from and communicate information to respective workload placement systems 202.

The GRAMs 254a–254c may be configured to perform various other functions in the WPS 250. One function includes compiling information regarding the capabilities of the components 122 contained in the data centers 252a–252c. The GRAMs 254a–254c may be configured to gather information regarding the components 122 as described hereinabove with respect to the workload placement module 228. As also described hereinabove, the workload placement module 228 may also be configured to determine the anticipated or scheduled workloads on the components 122. The GRAMs 254a–254c may also include the communication module 220, and may be configured to transmit information pertaining to the components 122 in the data centers 252a–252c to the information service 222. In this regard, the GRAMs 254a–524c may comprise the workload placement module 228 described hereinabove with respect to FIG. 2A.

The information service 222 may comprise a computer system or other computing device capable of communicating with the GRAMS 254a–254c through a network, such as, the Internet 226. The information service 222 generally operates as hardware and/or software where information from the GRAMs 254a–254c may be registered and stored. In addition, the information service 222 may be physically located at any reasonably suitable location. For instance, the information service 222 may form part of a component in the WPS 250, for instance, a GRAM 254a–254c, energy aware co-allocator 224, etc. Alternatively, the information service 222 may form a separate device and may be located in a distinct geographic location from the other components of the WPS 250.

The GRAMs 254a–254c may also function to collect SHI information. The GRAMS 254a–254c may thus include the heat index calculator module 218. The GRAMs 254a–254c may communicate the SHI information to the information service 222 through the communication module 220. For instance, the communication module 220 may be connected to the information service 222 through the Internet 226.

The GRAMs 254a–254c may be programmed with geographic location information. For instance, the GRAMs 254a–254c may be programmed with information pertaining to the State, country, continent, time zone, etc., at which the associated rooms 252a–252c are respectively located. The GRAMs 254a–254c may also include respective temperature sensors configured to detect the ambient temperatures of associated data centers 252a–252c. This information may also be provided to the information service 222 through the communication module 220.

The energy-aware co-allocator 224 is configured to query the information service 222 to obtain information regarding various characteristics of the data centers 252a–252c. The co-allocator 224 may also comprise a computing device, for instance, a computer system, server, hardware, software, etc., operable to perform various functions as described below. In one regard, the co-allocator 224 may operate to select a data center 252a–252c to perform a requested application. The selection of the data center 252a–252c may substantially be based upon energy efficiency coefficients of the data centers 252a–252c. More particularly, the co-allocator 224 may select the data center 252a–252c having the highest energy efficiency coefficient ($\chi$). The energy efficiency coefficient ($\chi_i$) of the ith data center 252a–252c may be determined through the following equation:

Equation 4: $\chi_i = \xi_i \frac{1}{\tau} \int COP_i(t)dt$, where

Equation 5: $\xi_i = 1/SHI$, of the ith data center,

Equation 6: $COP_i = \frac{Q_{evap}}{W_c}$, where $Q_{evap}$ is the desired heat output of the data center and $W_c$ is the work input, for instance, by a compressor,
$\tau$ is a duration in which the application is to be scheduled, and
t is the time of day in which the application is to be scheduled for performance.

The co-allocator 224 may select the data center 252a–252c having the highest energy efficiency coefficient ($\chi$) at the time of the application placement. The highest or maximum energy efficiency coefficient ($\chi$) may be identified as a workload placement indicator (WPI), given by:

WPI=max($\chi_i$)∀$_i$         Equation 7

As shown in equation (4), the energy efficiency coefficient ($\chi_i$) of the ith data center is based upon a plurality of factors. These factors include, the SHI of the data center, the duration ($\tau$) in which the application is to be scheduled, the time of day (t) in which the application is to be scheduled, and the coefficient of performance (COP) of the data center. As discussed in the Background section, the COP varies depending upon the ambient conditions around the data centers 252a–252c. In addition, the COP of the data centers 252a–252c may also vary depending upon the type of cooling technology employed as well as the operating loads in the data centers 252a–252c. Thus, the energy efficiency coefficient ($\chi_i$) for a data center 252a–252c may vary depending upon the time of day in a particular region where the data center 252a–252c is located, as well as various other factors related to their COPs.

Figure 3A:
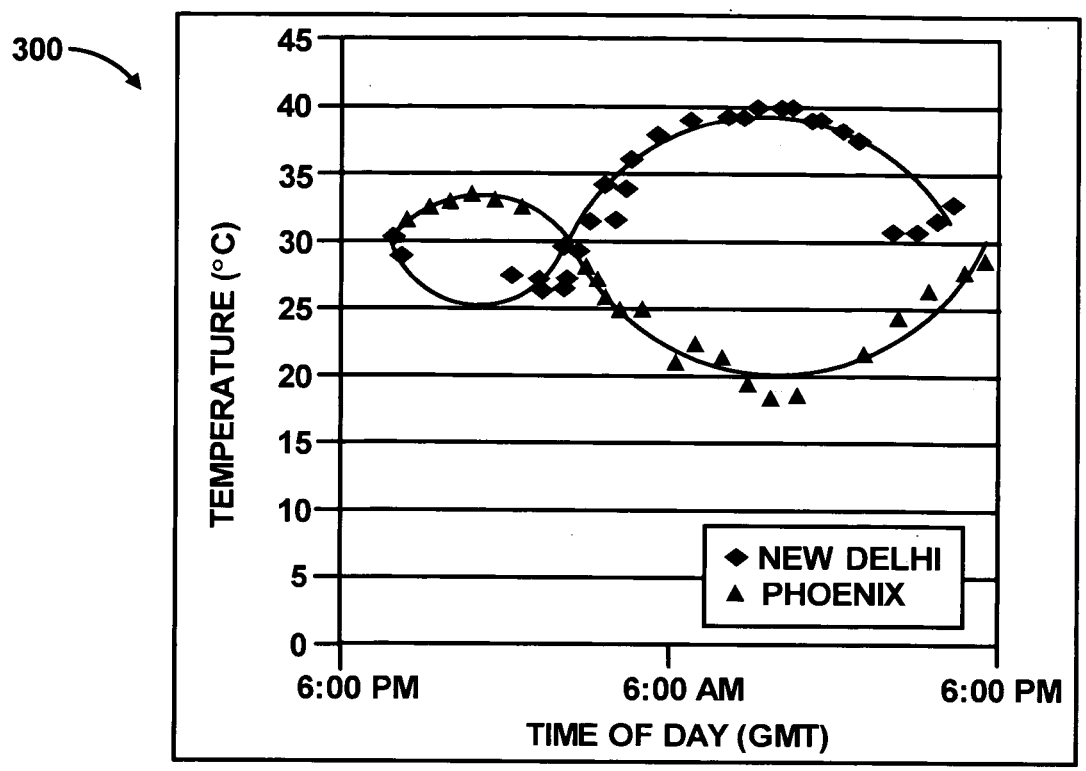
FIG. 3A illustrates an exemplary diagram of the ambient temperatures in New Delhi, India and Phoenix, Ariz. at particular Greenwich Mean Times.

As an example, the data center 252a may be considered as being located in Phoenix, Ariz., and the data center 252b may be considered as being located in New Delhi, India. A diagram 300 of the ambient temperatures in Phoenix and New Delhi at various Greenwich Mean Times (GMTs) on a typical day in May 2002 is illustrated in FIG. 3A. As shown in the diagram 300, the ambient temperatures in Phoenix and New Delhi vary depending upon the GMT at which the temperatures are taken. In this regard, the COPs of the data centers 252a and 252b may also vary depending upon their respective GMTs. In addition, therefore, the energy efficiency coefficients ($\chi_i$) for the data centers 252a and 252b may also vary at different GMTs.

Figure 6A:
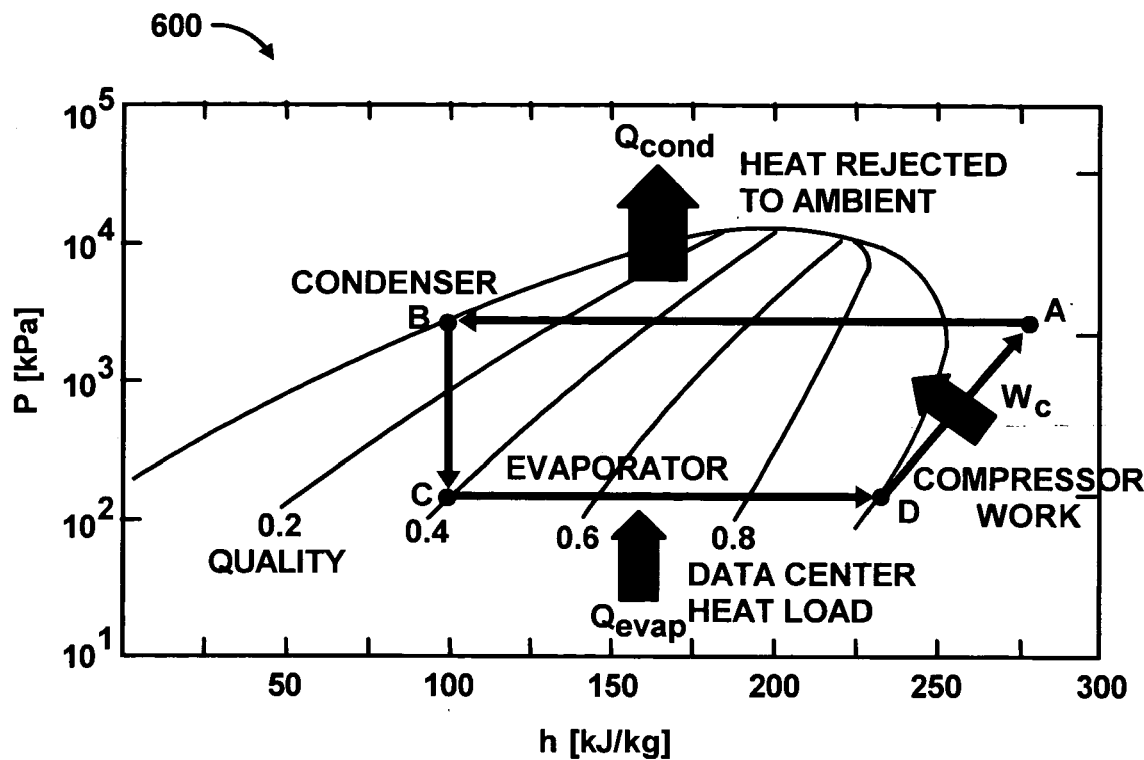
FIG. 6A illustrates a chart of a conventional vapor-compression cycle using R134a refrigerant.
Figure 6B:
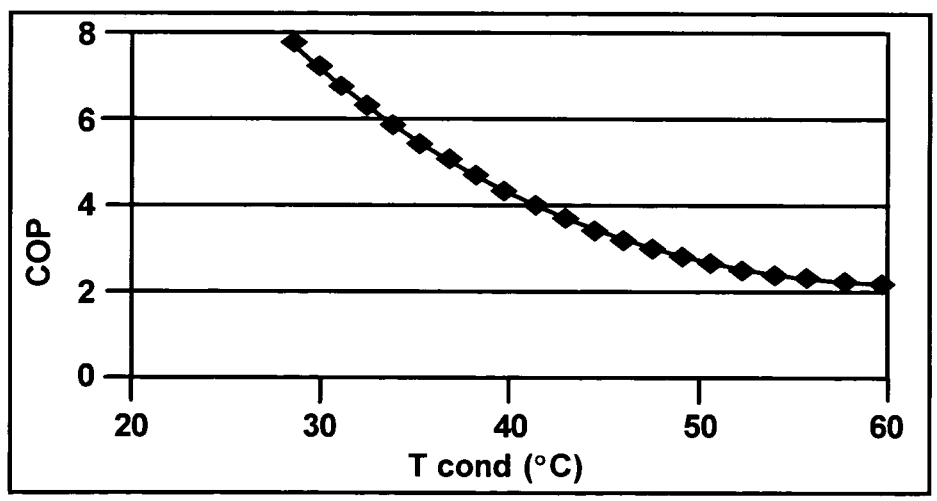
FIG. 6B illustrates a coefficient vs. temperature chart for a conventional air conditioning unit.

To further elaborate, as shown in FIG. 3A, afternoon temperatures in New Delhi reach a maximum of 40 C when the night temperatures in Phoenix drops to below 20 C. Assuming that the condenser temperature is 10 C higher than the ambient temperature at this time of operation, data centers in New Delhi and Phoenix would have condenser temperatures of 50 C and 30 C, respectively. From the COP curve 602 in FIG. 6B, the COPs for these operating conditions may be taken to be 3.32 and 7.61, respectively. This result clearly indicates that the workload placement in New Delhi would be 56% more energy intensive than that in Phoenix at that time of day. Therefore, placing the workload in the data center located in Phoenix at that time of day would be more beneficial in terms of energy usage.

Another factor that may be considered in determining where to place workloads is the ambient humidity around each of the data centers 252a–252c. More particularly, depending upon the relative humidity (RH) of the air surrounding a data center, cooling of data center supply air may also involve, inadvertently, condensing moisture from the air. For instance, cooling air at 30 C, and at 50% RH to 15 C and 98% RH involves condensation of 3 grams of moisture for every kilogram of air. Therefore, about 30% of the actual cooling capacity is wasted in extraction of latent heat during condensation. The condensation process leads to latent heat load on the cooling system, not accounted for by the sensible cooling capacity provided by the system. Such an extraneous load generally reduces the effective sensible cooling obtainable from the cooling system. Typically, outside air makes up 10% of the total re-circulation volume flow rate of air in a data center. Therefore, the effect of relatively humidity of ambient air on data center cooling performance is an order of magnitude lower than that of condenser temperature. However, higher ambient RH is a potential disadvantage because it negates the use of less energy-intensive methods like evaporative cooling for data center cooling systems.

Figure 3B:
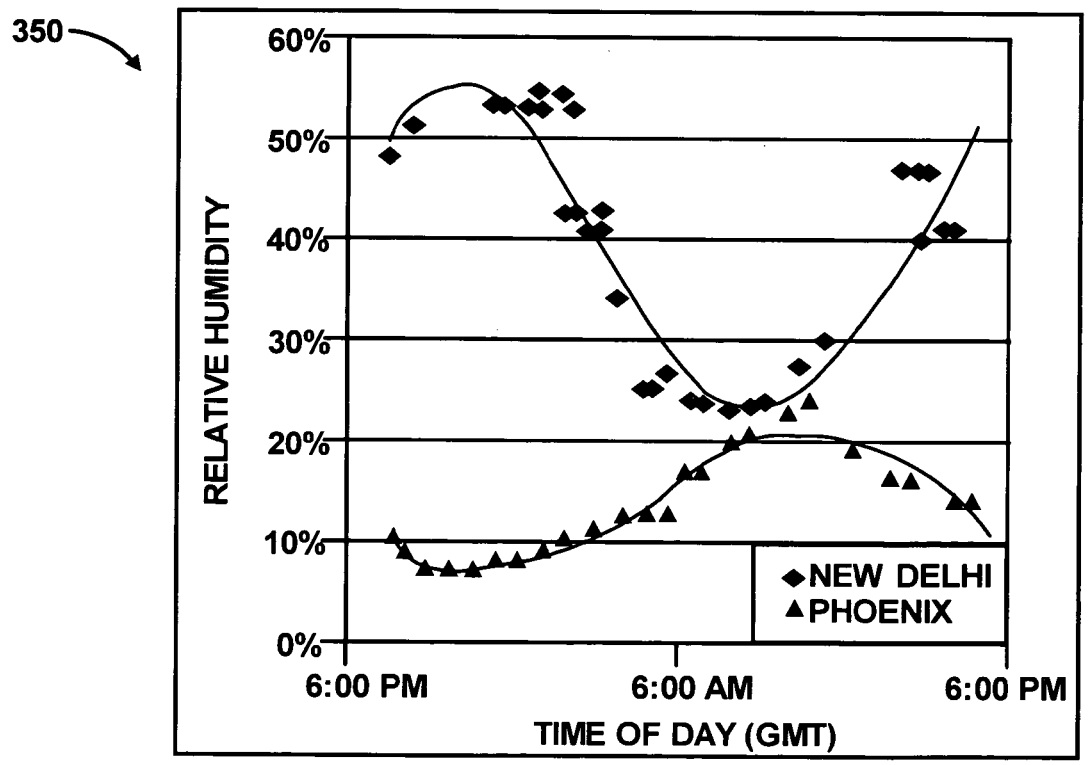
FIG. 3B illustrates an exemplary diagram of the relative humidity measurements in New Delhi, India and Phoenix, Ariz. at particular Greenwich Mean Times.

As illustrated in FIG. 3B, a diagram 350 shows the RH levels in Phoenix and New Delhi at various GMTs during a day. In the diagram 350, the RH levels vary between Phoenix and New Delhi at particular times during the day, but are similar during, for instance, the afternoon time period in New Delhi. Thus, for instance, if the time in which workload is to be placed is around the afternoon period in New Delhi, the RH levels may not provide a significant factor in determining the workload placement. However, if the workload is to be placed around the evening time period in New Delhi, the RH levels may be factored in determining the data center to which the workload is to be placed. More particularly, because there is a nearly 40% difference in RH between Phoenix and New Delhi, although the ambient temperature in Phoenix may be relatively higher than in New Delhi at that time, the workload may still be placed in the data center located in Phoenix due to the difference in RH levels.

As described hereinabove, the COPs of the data centers 252a–252c may vary according to the RH levels around the data centers 252a–252c. In addition, the co-allocator 224 may be configured to consider the RH levels in selecting a data center 252a–252c to perform the application 258.

According to an example, the co-allocator 224 may use modified COP values for the data centers 252a–252c. The modified COP values may be based upon a ratio of the power consumed by the components 122 and the power consumed by the CRAC unit 114 in cooling the components 122. The power consumed by the CRAC unit 114 includes the power required in dehumidifying the cooling fluid delivered to the components 122. In this regard, the data centers 252a–252c having RH levels higher than a predetermined set point will require greater levels of dehumidification, which translates to greater power required by the CRAC unit 114 in cooling the components 122. Based upon this relationship between the power consumed by the components 122 and the power consumed by the CRAC unit 114, the modified COP values would decrease for data centers 252a–252c having RH levels higher than the predetermined set As a further example, the RH levels of the data centers 252a–252c may be compared to predetermined set point values. The predetermined RH set point levels may be based upon a plurality of factors. For instance, these levels may be based upon component 122 or CRAC unit 114 manufacturer specifications, testing of CRAC unit 114 power consumption levels for various RH levels, etc. Under this example, if the measured RH level for a given data center 252a–252c is within a predetermined error level from a predetermined RH set point level, for instance, within about 8% of the RH set point level, the co-allocator 224 may consider that data center 252a–252c as a candidate for performing the requested application. However, if the measured RH level for the given data center 252a–252c falls outside of the error level, the co-allocator 224 may remove that data center 252a–252c from consideration. In any respect, the co-allocator 224 may select the data center 252a–252c to perform the application 258 from the remaining candidate data centers 252a–252c.

In addition, the co-allocator 224 may be configured to select the data center 252a–252c based upon the forecasted energy efficiency coefficient ($\chi$) values of the data centers 252a–252c if the application 258 is performed by those data centers 252a–252c. Thus, for instance, the GRAMS 254a–254c may be configured to forecast or otherwise model the SHI levels of their respective data centers 252a–252c with the additional workload placed on them. The GRAMs 254a–254c may calculate the energy efficiency coefficients ($\chi$) of the data centers 252a–252c based upon the forecasted SHI levels. In this regard, the energy efficiency coefficients ($\chi$) of the data centers 252a–252c may vary with the additional workload. The co-allocators 224 may be configured to account for the possibility that the energy efficiency coefficients ($\chi$) may vary and thus may select the data center 252a–252c having the highest WPI with the projected workload.

The changes to the SHI based upon the anticipated additional workload may be determined through, for instance, testing of the data centers 252a–252c with various workloads to determine their effects on the SHI. Alternatively, the changes to the SHI may be calculated based upon manufacturer specified heat dissipation characteristics of the components 122 contained in the data centers 252a–252c. As a further alternative, a combination of manufacturer specified heat dissipation characteristics and testing may be implemented to determine the affects of the increased workloads on the SHI levels of the data centers 252a–252c.

In any regard, the anticipated SHI levels and/or energy efficiency coefficients ($\chi$) may be stored in the memories of the GRAMs 254a–254c in form of look-up tables, charts, etc. In addition, this information may be transmitted to the information service 222 and retrieved by the co-allocator 224.

Also illustrated in FIG. 2B is a broker 256 configured to select one or more data centers 252a–252c to perform a requested application based upon criteria not related to energy usage or energy conservation. Instead, the broker 256 is configured to query the information service 222 to determine which data centers 252a–252c are capable of performing the requested application. In one regard, the broker 256 may comprise a computing device or software operating on a computing device, configured to select one or more qualifying data centers 252a–252c.

In making this determination, the broker 256 is configured to obtain information regarding the resources available in the data centers 252a–252c. More particularly, the broker 256 may determine whether one or more of the data centers 252a–252c contain appropriate resources (i.e., machines, software, operating systems, resource instances, etc.) to perform the requested application. The broker 256 may also receive information from the information service 222 pertaining to the number of resources available to perform the requested application as well as whether the resources have sufficient amounts of resource instances to perform the requested application. In addition, the broker 256 may determine whether there are any constraints which would prevent a data center 252a–252c from performing the requested application. The constraints may include, for instance, restrictions or security issues, which may prevent the allocation of a workload to a particular data center. The constraints may thus include licensing agreements requiring that certain applications be performed within the U.S., for example.

In operation, the broker 256 may receive an application 258 request in the form of a resource specification language (RSL). The RSL may include a description of the services required by a particular application 258. The broker 256 may be configured to determine which specific resources and their quantities are needed to perform the required services of the particular application 258, which may be considered as a ground RSL. In one regard, the broker 256 may operate to translate the RSL into the ground RSL. By way of example, an application 258 may include a request, in RSL, for a portal application with BEA and Oracle that is point. However, if the RH levels are below the predetermined set point, the CRAC unit 114 may attempt to humidify the cooling fluid delivered to the components 122. In this situation, because the humidification process also requires additional power consumption by the CRAC unit 114, the modified COP will, therefore, be affected by the humidification process as well. The modified COP may thus be used in place of the COP described hereinabove with respect to the determination of the energy efficiency coefficient ($\chi$). In addition, the co-allocator 224 may select the data center 252a–252c having the highest energy efficiency coefficient ($\chi$) based upon the modified COP to perform the requested application 258.

According to another example, a penalty factor may be included in the determination of the energy efficiency coefficients ($\chi$) of the data centers 252a–252c. The penalty factor may substantially be based upon the RH levels around the data centers 252a–252c. Thus, for instance, if the RH level is higher than a predetermined setpoint, a dehumidifier of a CRAC unit 114 may be in operation. If the dehumidifier is in operation, a penalty factor may be included in the determination of the COP for that data center 252a–252c. By way of example, the co-allocator 224 may decide to withdraw any data centers 252a–252c from consideration in determining whether to allocate the application in that data center 252a–252c, if the penalty factor is detected.

Alternatively, the penalty factor may be assigned according to the level of dehumidifier (or humidifier) operation in the data center 252a–252c. Thus, for instance, values may be assigned to various levels of dehumidifier (or humidifier) activity, which may correlate to the penalty factors of the data centers 252a–252c having dehumidifiers that are operating. In this example, a larger penalty factor may be assigned to those data centers 252a–252c having higher levels of dehumidifier or humidifier activity. The penalty factors may, for instance, be subtracted from or otherwise reduce the COP of the data centers 252a–252c for which the dehumidifiers are operating. In addition, the levels to which the COPs are reduced may be based upon the dehumidification (or humidification) levels. In this regard, the energy efficiency coefficients ($\chi$) of the data centers 252a–252c having the reduced levels of COP will be lower than for those data centers 252a–252c having COPs which are not reduced due to dehumidification (or humidification) operations. configured to serve 100 users per hour. The broker 256 may translate this request into ground RSL, which may include an indication that, for instance, 5 rp2450 servers with greater than 1 GB of memory, 12 1 p2000r servers, and 8 DL360's are required to perform that requested application 258.

In general, the ground RSL may specify that a certain number of computing devices having predefined architectures operable to run for a predefined period of time are required to perform a particular application 258. The broker 256 may query the information service 222 for information relating to the available resources in the data centers 252a–252c. The broker 256 may compare the available resources in the data centers 252a–252c with the resource requirements set forth in the ground RSL to determine which of the data centers 252a–252c have sufficient resources to perform the requested application 258. The comparison maybe performed in a number of different manners. For instance, the ground RSL information of the application 258 requirements and the data center 252a–252c information from the information service 222 may be compiled into charts or tables, which the broker 256 may directly compare.

If the broker 256 determines that none of the data centers 252a–252c have sufficient resources to perform the requested application, the broker 256 may determine that the application 258 may not be performed. If the broker 256 determines that a single data-center 252a–252c has sufficient resources to perform the requested application, the broker 256 may submit the requested application 258 to that data center 252a–252c, such that, the application 258 may be performed by that data center 252a–252c. If the broker 256 determines that more than one data center 252a–252c qualifies to perform the requested application 258, the broker 256 may transmit the identities of the qualifying data centers 252a–252c to the co-allocator 224.

Alternatively, the broker 256 may transmit the ground RSL requirements to the co-allocator 224. In this instance, the co-allocator 224 may query the information service 222 to obtain the information relating to the available resources in the data centers 252a–252c. The co-allocator 224 may compare the ground RSL requirements with the available resources in the data centers 252a–252c to determine which of the data centers 252a–252c are capable of performing the requested application 258. The co-allocator 224 may select one of the qualifying datacenters 252a–252c based upon the energy efficiency coefficients of the qualifying data centers 252a–252c. Thus, for instance, the co-allocator 224 may select the data center 252a–252c having the highest energy efficiency coefficient, as described hereinabove.

According to another example, the co-allocator 224 may receive the application 258 request directly, without receiving information from the broker 256. In this example, the application 258 request may be submitted directly to the co-allocator 224 in the form of the ground RSL. As described hereinabove, the co-allocator 224 may compare the ground RSL requirements with the resources available in the data centers 252a–252c to determine which of the data centers 252a–252c contain appropriate resources to perform the requested application 258. In addition, the co-allocator 224 may select one of the data centers 252a–252c to perform the requested application 258 as also described hereinabove.

Figure 4A:
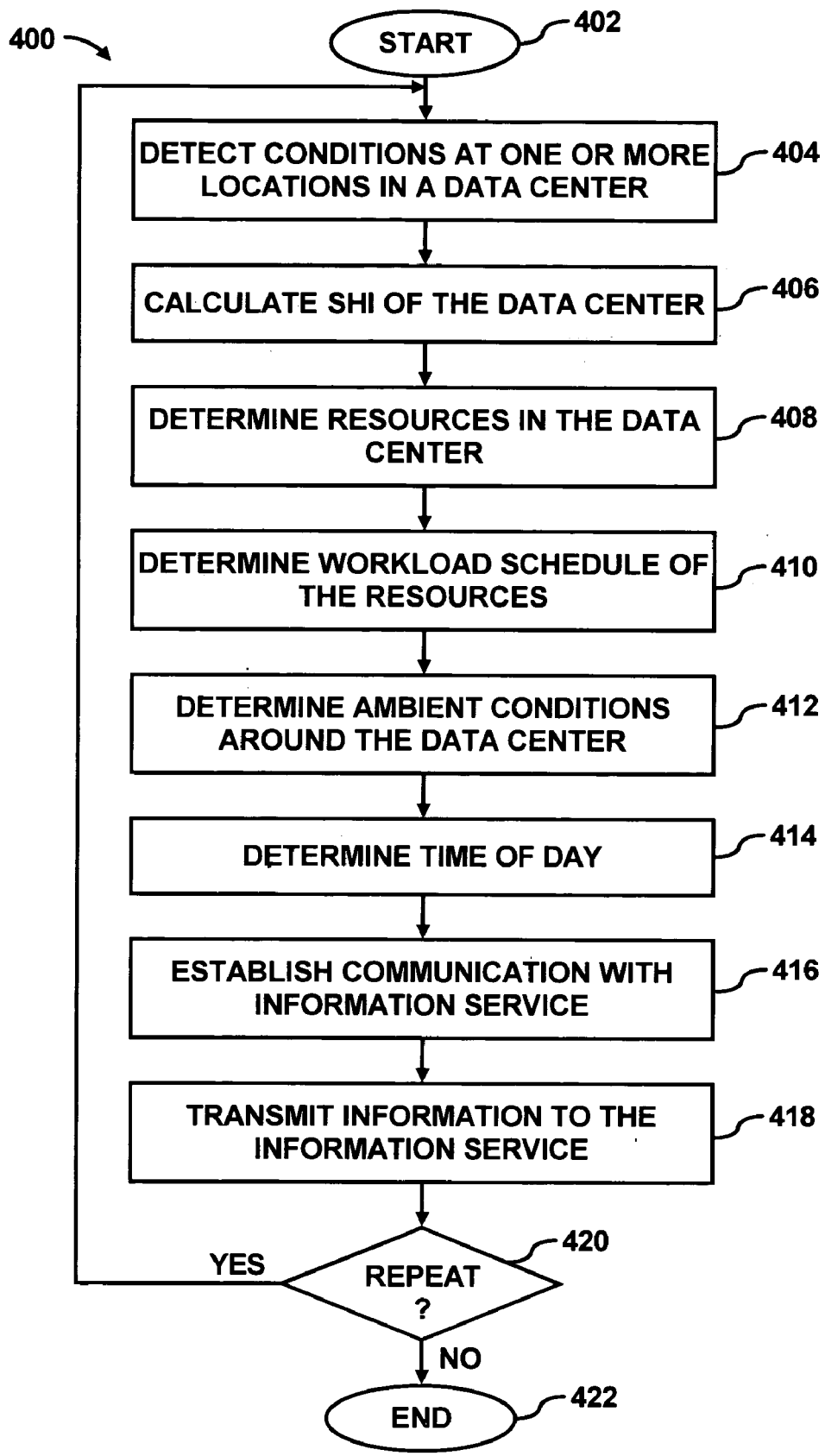
FIG. 4A illustrates an exemplary flow diagram of an operational mode of a method for workload placement among data centers, according to an embodiment of the invention.

FIG. 4A illustrates an exemplary flow diagram of an operational mode 400 of a method for workload placement. It is to be understood that the following description of the operational mode 400 is but one manner of a variety of different manners in which an embodiment of the invention may be practiced. It should also be apparent to those of ordinary skill in the art that the operational mode 400 represents a generalized illustration and that other steps may be added or existing steps may be removed, modified or rearranged without departing from the scope of the invention.

The description of the operational mode 400 is made with reference to the block diagram 200 illustrated in FIG. 2A, and thus makes reference to the elements cited therein. It should, however, be understood that the operational mode 400 is not limited to the elements set forth in the block diagram 200. Instead, it should be understood that the operational mode 400 may be practiced by a workload placement system having a different configuration than that set forth in the block diagram 200.

The operational mode 400 may be initiated or started as indicated at step 402. The initiation of the operational mode 400 may include activation of the components 122 and the cooling system (for instance, the CRAC unit 114 and vent tiles 116) in the data center 100. Once activated, the sensors 208–212 may detect conditions at one or more locations of the data center 100, as indicated at step 404. For instance, the sensors 208–212 may be positioned to detect the temperature of cooling fluid supplied by the CRAC unit 114, the temperatures of the cooling fluid at the inlets of various racks, the temperatures of the cooling fluid at the outlets of various racks, etc. Based upon the detected conditions, the heat index calculator module 218 may calculate a supply heat index (SHI) of the data center 100 at step 406.

The heat index calculator module 218 may also be configured to determine SHI levels for various loading conditions. The heat index calculator module 218 may determine the SHI levels either through testing or based upon manufacturers' specified thermal outputs of the components 122. In this regard, the SHI levels may be based upon anticipated loading levels of the data center 100. The information obtained by the heat index calculator module 218 may be stored in the memory 214 and may also be communicated to the information service 222.

At step 408, the workload placement module 228 may determine the resources, for instance, components 122, computer systems, servers, displays, other hardware and software, etc., in the data center 100. The determination of resources may be similar to performing an inventory of the resources in the data center 100 and may be stored as a table or in any other suitable form, for instance, in the memory 214. The workload placement module 228 may also determine the current workload on the resources as well as their scheduled workloads at step 410.

The controller 204 may also receive information pertaining to the ambient conditions around the data center 100 from the external sensor 232 at step 412. In addition, the controller 204 may receive information pertaining to the time of day from the clock 234 at step 414. The time of day received from the clock 234 may be associated with the time in which various input information is received by the controller 204. The time received from the clock 234 may pertain to the local time or it may be based upon the GMT. In any regard, the controller 204 may store the information received through the input module 206 in the memory 214. This information may include, for instance, the SHI information, the resource information, the ambient condition temperature, and the time information.

At step 416, communication between the controller 204 and the information service 222 may be established. The establishing of the communication may comprise forming a link to the information service 222 with the communication module 220. The communication module 220 may form a communication link with the information service 222 through any reasonably suitable known manner, for instance, through the Internet 226.

The controller 204 may transmit the information described hereinabove to the information service 222 at step 418. The transmission of the information to the information service 222 may include transmission of the identities of the data centers 252a–252c to which the GRAMs 254a–154c are associated. The data centers 252a–252c may be identified through assigned serial numbers, HP addresses, or other known identification means.

Following step 418, the controller 204 may determine whether the operational mode 400 is to be repeated at step 420. The controller 420 may determine that the operational mode 400 is to be repeated, for instance, in response to a request by the information service 222, after a predetermined number of iterations, after a predetermined amount of time has elapsed, at predefined times during a day, manually repeated by a user, etc. If it is determined that the operational mode 400 is to be repeated at step 420, steps 404–420 may be repeated until an end condition is met at step 420.

An end condition, as indicated at step 422, may be reached when the controller 204 determines that the operational mode 400 is to be discontinued. For instance, the controller 204 may determine that the operational mode 400 is to be discontinued if none of the conditions for repeating the operational mode 400 exists. In addition, the controller 204 may be manually instructed by a user to stop performance of the operational mode 400. As a further example, the operational mode 400 may be discontinued when power supply to the components and/or cooling system are turned off. In any regard, the end condition 422 may be similar to an idle mode for the operational mode 400 since the operational mode 400 may be re-initiated.

Figure 4B:
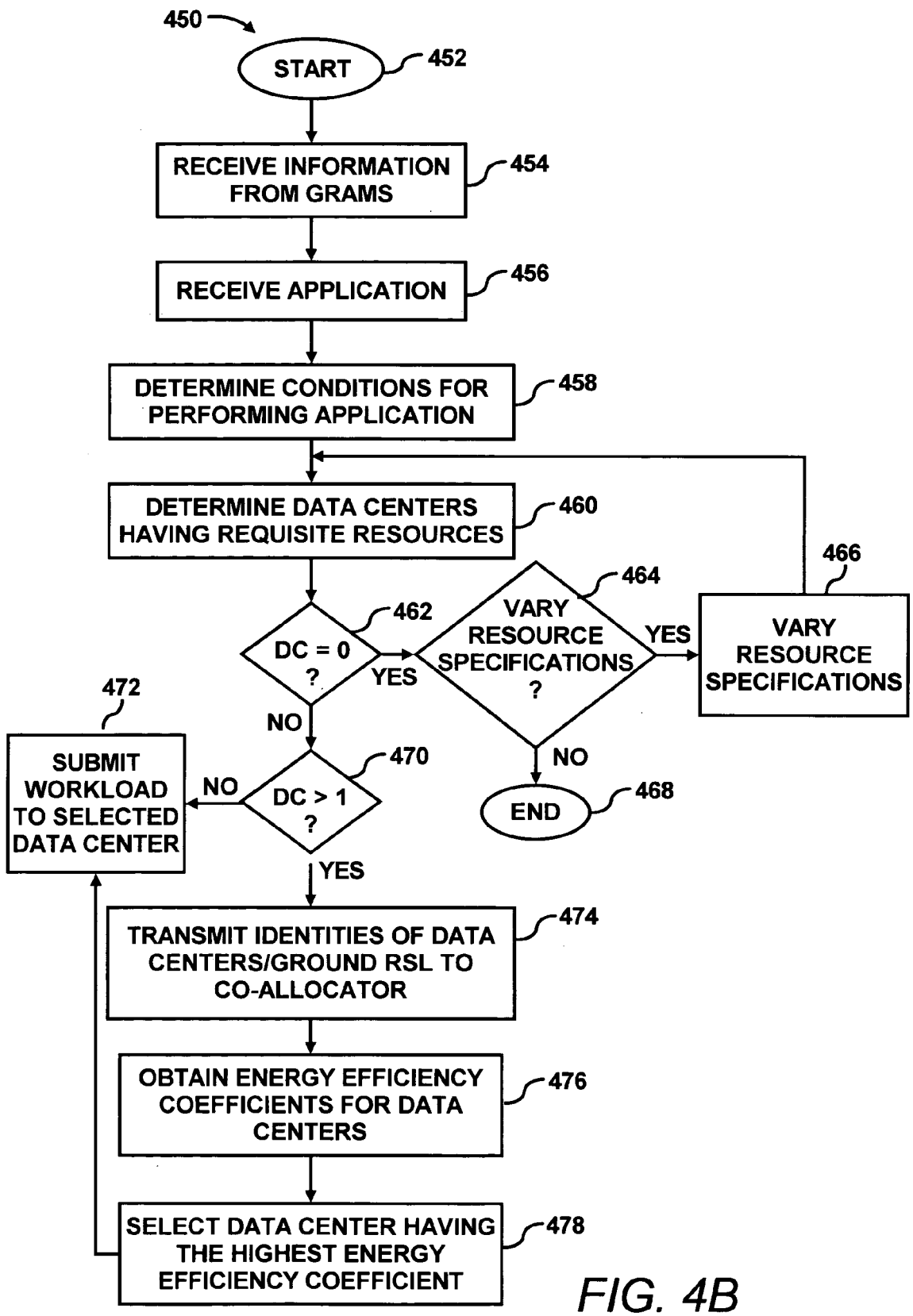
FIG. 4B illustrates an exemplary flow diagram of an operational mode of a method for workload placement among data centers, according to an embodiment of the invention.

FIG. 4B illustrates an exemplary flow diagram of an operational mode 450 of a method for workload placement. It is to be understood that the following description of the operational mode 450 is but one manner of a variety of different manners in which an embodiment of the invention may be practiced. It should also be apparent to those of ordinary skill in the art that the operational mode 450 represents a generalized illustration and that other steps may be added or existing steps may be removed, modified or rearranged without departing from the scope of the invention.

The description of the operational mode 450 is made with reference to the block diagram 250 illustrated in FIG. 2B, and thus makes reference to the elements cited therein. It should, however, be understood that the operational mode 450 is not limited to the elements set forth in the block diagram 250. Instead, it should be understood that the operational mode 450 may be practiced by a workload placement system having a different configuration than that set forth in the block diagram 250.

The operational mode 450 may be initiated or started as indicated at step 452. The operational mode 450 may be initiated by establishing communications between the GRAMs 254a–254c and the information service 222. In addition, the GRAMs 254a–254c may transmit information to the information service 222, as indicated at step 454. Thus, steps 452 and 454 may be similar to steps 416 and 418, respectively, as described in FIG. 4A. As described hereinabove, the GRAMs 254a–254c may comprise the controller 204 and may also operate in manners similar to those described hereinabove with respect to FIG. 4A. In this regard, the GRAMs 254a–254c of respective data centers 252a–252c may transmit information pertaining to SHI information, resource information, ambient condition temperatures, time information, etc. The information service 222 may store this information in an associated memory.

In addition, or alternatively, the operational mode 450 may be initiated through receipt of an application 258 request, as indicated at step 456. Depending upon, for instance, the scope of the RSL corresponding to the application 258, the application 258 request may be received by either or both of the broker 256 and the energy-aware co-allocator 224. More particularly, if the request is submitted in the form of the RSL, the broker 258 may receive the application 258. However, if the request is submitted in the form of ground RSL, the co-allocator 224 may receive the application 258 request.

In the event that the application 258 request is submitted to the broker 256 in the form of the RSL, the broker 256 may determine the conditions for performing the application 258, at step 458, which may include translating the RSL into ground RSL. The conditions for performing the application 258 may include, for instance, information pertaining to the resources required to perform the requested application 258, the time required to perform the requested application 258, whether any constraints exists on where and/or when the application 258 is performed, etc. As described hereinabove, these conditions may be transmitted with the application 258 request in the form of the RSL.

The broker 256 may query the information service 222 to obtain some or all of the information received by the information'service 222 from the GRAMs 254a–254c. The broker 256 may compare the ground RSL information with the information received from the GRAMs 254a–254c to determine which of the data centers 252a–252c comprise the necessary resources to perform the requested application 258. The broker 256 may compile a list of data centers 252a–252c or otherwise identify the data centers 252a–252c that have the requisite resources to perform the requested application 258 at step 460. If the broker 256 determines that none of the data centers (DCs) 252a–252c comprise the requisite resources at step 462, the broker 256 may determine whether to vary resource specifications at step 464. The broker 256 may decide to vary the resource specifications at step 464 if the broker determines 256 that some of the resource requirements may be varied to enable the application 258 to be performed by one or more of the data centers 252a–252c. For instance, the broker 256 may determine that one or more of the data centers 252a–252c may be able to perform the application 258 if a fewer number of processors were implemented for a longer period of time. In this instance, the broker 256 may vary the resource specifications at step 466 by changing some aspect of the specifications required by the application 258, for instance, the broker 256 may vary the types of components for performing the requested application 258.

If, however, the broker 256 decides not to vary the resource specifications at step 464, the operational mode 450 may end as indicated at step 468. The broker 256 may decide to not vary the resource specifications, for instance, if the broker 256 determines that none of the data centers 252a–252c have sufficient resources to perform the requested application 258 even if the resource specifications were changed. As another example, the broker 256 may be unauthorized to change the resource specifications and thus may be unable to change the resource specifications. Step 468 may be equivalent to an idle mode for the operational mode 450 since the operational mode 450 may be re-initiated in response to receipt of another application 258 request, manually initiated, etc.

If there is at least one data center 252a–252c having the requisite resources to perform the requested application 258, the broker 256 may determine which of the data centers 252a–252c may perform the requested application. The broker 256 may determine whether there is more than one data center (D.C.) 252a–252c capable of performing the requested application 258 at step 470. If there is only one data center 252a–252c capable of performing the requested application 258, the broker 256 may instruct that data center 252a–252c to perform the requested application 258 at step 472. If the broker 256 determines, however, that there are more than one qualifying data centers 252a–252c, the broker 256 may transmit the identities of the qualifying data centers 252a–252c to the energy aware co-allocator 224 at step 474. Alternatively, and as described in greater detail hereinabove, the broker 256 may transmit the ground RSL to the co-allocator 224.

The co-allocator 224 may query the information service 222 to obtain the energy efficiency coefficients ($\chi$) of the qualifying data centers 252a–252c from the information service 222 or the information, such as SHI and COP from the information service 222, such that the co-allocator 224 may calculate the energy efficiency coefficients ($\chi$) of the data centers 252a–252c, at step 476. In determining the energy efficiency coefficients ($\chi$) of the data centers 252a–252c, the COPs of the data centers 252a–252c at the time the application 258 is to be performed may be used. Thus, if the application 258 is to be performed at the time the request is made, the COPs of the data centers 252a–252c at the time the application 258 is requested may be used to determine the energy efficiency coefficients ($\chi$) of the data centers 252a–252c. Alternatively, if the application 258 is to be performed at a later time, the forecasted COPs of the data centers 252a–252c may be employed to determine the energy efficiency coefficients ($\chi$). In addition, the COPs of the data centers 252a–252c may be averaged over the period of time in which the application 258 is configured to be performed. In one example, the energy efficiency coefficients ($\chi$) may be based upon an average of the COPs over a period of time for each data center 252a–252c.

As another example, the co-allocator 224 may determine the energy efficiency coefficients ($\chi$) of the data centers 252a–252c with the anticipated workload or application 258 performed by those data centers 252a–252c. As described hereinabove, the GRAMs 254a–254c may determine how the SHI levels would be affected with the increased workload applied to the data centers 252a–252c. As the SHI levels change, so too does the energy efficiency coefficients ($\chi$) of the data centers 252a–252c. In this regard, the energy efficiency coefficients ($\chi$) may differ between current conditions and under anticipated loading conditions. Depending upon the manner in which the co-allocator 224 is configured to operate, the co-allocator 224 may base its selection of a data center 252a–252c upon either condition.

As a further example, the energy efficiency coefficients ($\chi$) of the data centers 252a–252c may be determined with the modified COP as described hereinabove. Alternatively, the energy efficiency coefficients ($\chi$), and more particularly, the COPs of the data centers 252a–252c may be reduced based upon RH levels around the data centers 252a–252c as also described hereinabove. In addition, one or more of the data centers 252a–252c may be withdrawn from consideration for performing the requested application 258 if their RH levels are outside of a predetermined error range from a predetermined RH set point level, as further described hereinabove.

The co-allocator 224 may compare the energy efficiency coefficients ($\chi$) of the data centers 252a–252c and select the data center 252a–252c having the highest energy efficiency coefficent ($\chi$) at step 478. The highest energy efficiency coefficient ($\chi$) may be considered as the workload placement indicator (WPI) since $WPL=\max(\chi_i) \forall_i$.

The co-allocator 224 may submit the workload or application 258 to the selected data center 252a–252c as indicated at step 472. The submission of the workload or application 258 to the selected data center 252a–252c may be performed through communications through the communication module 220 of the GRAM 254a–254c associated with the selected data center 252a–252c.

In an alternate example, if the application 258 is directly submitted to the co-allocator 224 through the ground RSL, steps 458–470 may be omitted. In addition, at step 474, the identities of the qualifying data centers 252a–252c or the ground RSL may be directly submitted to the co-allocator 224. The co-allocator 224 may also obtain the energy efficiency coefficients for the qualifying data centers 252a–252c at step 476, and steps 478 and 472 may be performed.

The operations set forth in the operational modes 400 and 450 may be contained as a utility, program, or subprogram, in any desired computer accessible medium. In addition, the operational modes 400 and 450 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
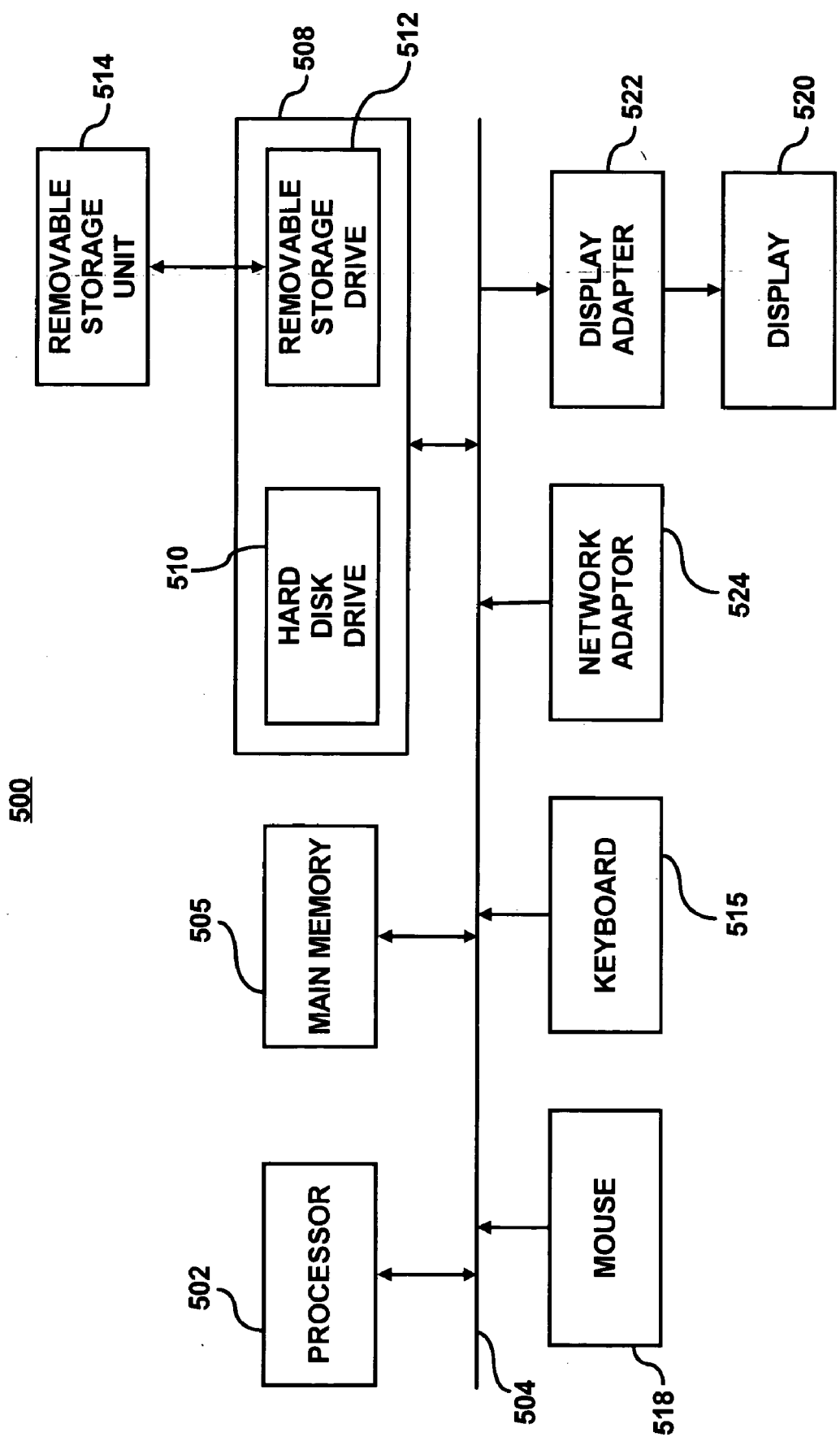
FIG. 5 illustrates an exemplary computer system, according to an embodiment of the invention.

FIG. 5 illustrates an exemplary computer system 500, according to an embodiment. The computer system 500 may include, for example, the controller 204, the information service 222, the co-allocator 224, the GRAMs 254a–254c, and/or the broker 258. In this respect, the computer system 500 may be used as a platform for executing one or more of the functions described hereinabove with respect to the various components of the workload placement systems 202 and 252.

The computer system 500 includes one or more controllers, such as a processor 502. The processor 502 may be used to execute some or all of the steps described in the operational modes 400 and 450. Commands and data from the processor 502 are communicated over a communication bus 504. The computer system 500 also includes a main memory 506, such as a random access memory (RAM), where the program code for, for instance, the device controller 238 and/or the controller of the computer system 244, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the provisioning system may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, e.g., the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (e.g., user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A system for workload placement among data centers, said system comprising:
   a plurality of grid resource allocation managers (GRAMs), wherein the GRAMs are configured to determine energy efficiency coefficients of the data centers, wherein the energy efficiency coefficients are functions of the coefficients of performance and supply heat indexes of the data centers;
   an information service configured to receive information from the plurality of GRAMs;
   a broker configured to receive an application request and to determine resource requirements from the application request, wherein the broker is configured to determine which of the data centers contains adequate resources to perform the requested application; and
   a co-allocator configured to receive information pertaining to the data centers having the adequate resources, wherein the co-allocator is further configured to select the data center having adequate resources and the highest energy efficient coefficient to perform the requested application.

2. The system according to claim 1, wherein the GRAMs are configured to receive sensed data from their respective data centers and to use the sensed data to determine the energy efficiency coefficients of the data centers.

3. The system according to claim 2, wherein the sensed data comprises temperature measurements from locations in the data centers and locations outside of the data centers.

4. The system according to claim 3, wherein a supply heat index of a data center is a quantification of the amount of re-circulation occurring that data center, and wherein the information received by the information service from the GRAMs contains the supply beat indexes of the data centers.

5. The system according to claim 4, wherein the GRAMs are further configured to determine supply heat indexes of the data centers under various anticipated loading conditions.

6. The system according to claim 2, wherein the sensed data comprises relative humidity measurements from locations outside of the data centers, arid wherein the co-allocator is further configured to consider the relative humidity measurements around the data centers in selecting a data center.

7. The system according to claim 1, wherein the GRAMs are configured to determine the resources contained in the data centers, and wherein the information received by the information service from the GRAMs contains information pertaining to the resources contained in the data centers.

8. The system according to claim 7, wherein the resources comprise one or more of machines, storage devices, and processors, and wherein the determination of the resources further comprises determining current and scheduled workloads of the resources.

9. The system according to claim 1, wherein the application request is in the form of a resource specification language, said resource specification language defining resource requirements for performance of the application.

10. The system according to claim 9, wherein the broker is configured to identify one or more qualifying data centers having the adequate resources through a comparison of the resource requirements for performance of the application and information regarding the resources in the data centers received from the information service.

11. The system according to claim 10, wherein the co-allocator is configured to receive the identities of the one or more qualifying data centers and to receive the energy efficiency coefficients of each of the qualifying data centers.

12. The system according to claim 11, wherein the energy efficiency coefficient ($\chi$) of a data center (i) is defined by the following equation:

$$\chi_i = \xi_i \frac{1}{\tau} \int COP_i(t) dt, \text{ where:}$$

$\xi_i = 1/SHI$, of the ith data center and where SHI is the supply heat index of the ith data center;

$$COP_i = \frac{Q_{evap}}{W_c},$$

where COP is the coefficient of performance of the ith data center, $Q_{evap}$ is the desired heat output of the data center and $W_c$ is the work input;

$\tau$ is a duration in which the application is to be scheduled; and t is the time of day in which the application is to be scheduled, and wherein the co-allocator is configured to select the data center having the highest energy efficiency coefficient.

13. The system according to claim 12, wherein the energy efficiency coefficient ($\chi$) is based upon a modified COP, said modified COP being a ratio of power consumption of the resources in a data center over the power consumption of an air conditioning unit in the data center.

14. The system according to claim 12, wherein the energy efficiency coefficient ($\chi$) includes a penalty factor for a data center having a relative humidity level higher than a predetermined set point.

15. The system according to claim 12, wherein the co-allocator is configured to withdraw from consideration one or more data centers having relative humidity levels that fall below a predetermined error level outside of a predetermined relative humidity level from performing the application.

16. The system according to claim 1, wherein the data centers are located in various geographically diverse locations.

17. The system according to claim 16, wherein the various geographically diverse locations comprise at least one of different counties, states, countries and continents.

18. The system according to claim 1, wherein the application request is in the form of a ground resource specification language, said ground resource specification language defining resource requirements for performance of the application, wherein the co-allocator is configured to receive the application request in the form of the ground resource specification language and wherein the co-allocator is further configured to select one of the data centers to perform the requested application based substantially upon a comparison between the resources defined in the ground resource specification language and the energy efficiency characteristics of the data centers.

19. A method of using a computer processor to place a workload among data centers, said method comprising:

receiving information regarding available resources in and energy efficiency characteristics of the data centers, said energy efficiency characteristics comprising functions of coefficients of performance and supply heat indexes of the data centers;

receiving a request to perform a workload;

comparing the available resources in the data centers with resources for performing the the workload;

determining which of the data centers contains adequate available resources to perform the workload;

using the computer processor to select one of the data centers containing adequate resources to perform the workload, wherein the computer processor is configured to select the data center having the highest energy efficiency characteristics; and placing the workload on the selected data center.

20. The method according to claim 19, said data centers being associated with grid resource allocation managers (GRAMS), said method further comprising:

in the GRAMs, detecting one or more environmental conditions inside and outside of the data centers and calculating the supply heat indexes based upon the detected one or more environmental conditions.

21. The method according to claim 20, wherein the step of detecting one or more environmental conditions comprises obtaining relative humidity measurements around the data centers and wherein the step of selecting one of the data centers to perform the application comprises considering the relative humidity measurements around the data centers in selecting the data center.

22. The method according to claim 19, wherein the step of determining which of the data centers contains adequate available resources to perform the application further comprises determining which of the data centers contains appropriate types of resources to perform the application, sufficient amounts of resources to perform the application, sufficient amounts of resource instances to perform the application, and are not subject to restrictions which would prevent the data centers from performing the application.

23. The method according to claim 22, further comprising:
  determining whether resource specifications should be varied in response to a determination that none of the data centers contains the available resources to perform the application; and
  varying the resource specifications in response to a determination that the resource specifications should be varied.

24. The method according to claim 22, further comprising:
  determining whether a single data center has sufficient available resources to perform the application; and
  submitting the application to the single data center in response to a determination that a single data center has sufficient available resources to perform the application.

25. The method according to claim 19, further comprising calculating the energy efficiency characteristics by:
  calculating the supply heat indexes of the data centers;
  determining the coefficient of performance of the data centers; and
  calculating energy efficiency coefficients of the data centers, based upon the supply heat indexes and the coefficients of performance.

26. The method according to claim 25, wherein the step of calculating the energy efficiency coefficient further comprises calculating energy efficiency coefficients ($\chi$) of each data center (i) through the following equation:

$$\chi_i = \xi_i \frac{1}{\tau} \int COP_i(t) dt, \text{ where:}$$

$\xi_i = 1/SHI$, of the ith data center and where SHI is the supply heat index of the ith data center;

$$COP_i = \frac{Q_{evap}}{W_c},$$

where COP is the coefficient of performance of the ith data center, $Q_{evap}$ is the desired heat output of the data center and $W_c$ is the work input;
  $\tau$ is a duration in which the application is to be scheduled; and
  t is the time of day in which the application is to be scheduled, and
  wherein the step of selecting a data center further comprises selecting the data center having the highest energy efficiency coefficient.

27. The method according to claim 26, wherein the step of calculating the energy efficiency coefficients ($\chi$) of each data center comprises calculating the energy efficiency coefficients ($\chi$) with a modified COP, said modified COP being a ratio of power consumption of the resources in a data center over the power consumption of an air conditioning unit in the data center.

28. The method according to claim 19, further comprising:
  calculating energy efficiency coefficients of the data centers based upon anticipated thermal characteristics of the data centers if the workload were performed by the data centers; and
  wherein the step of selecting a data center further comprises selecting the data center having the highest energy efficiency coefficient while performing the workload.

29. The method according to claim 19, wherein the workload is in the form of a resource specification language defining resources required to perform the workload, and wherein a broker is configured to perform the steps of receiving a request to perform the workload and receiving the information said broker being further configured to perform the steps of comparing the available resources in the data centers with resources required to perform the workload and determining which of the data centers contains adequate resources to perform the workload.

30. The method according to claim 19, wherein the workload is in the form of a ground resource specification language defining which of the data centers comprise adequate resources to perform the request, wherein a co-allocator is configured to perform the steps of receiving a request to perform the workload and receiving the information the co-allocator being further configured to perform the steps of selecting one of the data centers to perform the workload.

31. A system for workload placement among data centers, said data centers being associated with means for allocating resources, said system comprising:
  means for registering information regarding available resources in and energy efficiency characteristics of the data centers received from the means for allocating resources of the data centers said energy efficiency characteristics comprising functions of coefficients of performance and supply heat indexes of the data centers;
  means for comparing the available resources to resources required for performing a requested workload;
  means for communicating between the means for comparing and the means for allocating resources;
  means for selecting one of the data center containing adequate resources to perform the workload based upon the energy efficiency characteristics of the data centers, wherein the means for selecting is configured to select the data center having the highest energy efficiency characteristics; and
  means for placing the workload on the selected data center.

32. The system according to claim 31, wherein the means for allocating resources comprises means for detecting one or more environmental conditions, means for calculating the supply heat indexes, means for determining resources available in the data centers, and means for communicating between the means for allocating resources and the means for registering information.

33. The system according to claim 31, wherein the means for allocating resources comprises means for calculating energy efficiency coefficients, wherein the means for calculating energy efficiency coefficients is configured to determine the energy efficiency coefficient ($\chi$) of each of the data center (i) through the following equation:

$$\chi_i = \xi_i \frac{1}{\tau} \int COP_i(t) dt, \text{ where:}$$

$\xi_i = 1/SHI$, of the ith data center and where SHI is the supply heat index of the ith data center;

$$COP_i = \frac{Q_{evap}}{W_c},$$

where COP is the coefficient of performance of the ith data center, $Q_{evap}$ is the desired heat output of the data center and $W_c$ is the work input;

τ is a duration in which the application is to be scheduled; and t is the time of day in which the application is to be scheduled, and wherein the means for selecting is configured to select the data center having the highest energy efficiency coefficient.

34. The system according to claim 31, further comprising:
means for obtaining relative humidity measurements around the data centers; and
wherein the means for selecting one of the data centers to perform the application based upon energy efficiency characteristics of the data centers further comprises means for factoring the relative humidity measurements in selecting one of the data centers.

35. The system according to claim 31, further comprising:
wherein the means for calculating energy efficiency coefficients of the data centers comprises means for calculating energy efficiency coefficients of the data centers based upon anticipated thermal characteristics of the data centers if the workload were performed by the data centers; and
wherein the for selecting one of the data centers to perform the workload based upon energy efficiency characteristics of the data centers further comprises means for selecting the data center having the highest energy efficiency coefficient while performing the workload.

36. The system according to claim 31, wherein the means for comparing the available resources to resources required for performing a requested application comprises a broker.

37. The system according to claim 31, wherein the means for comparing the available resources to resources required for performing a requested application comprises a co-allocator.

38. A computer readable storage medium on which is embedded one or more computer programs, said one or more computer programs implementing a method of using a computer processor to place a workload among data centers, said one or more computer programs comprising a set of instructions for:
receiving information regarding available resources in and energy efficiency coefficients of the data centers, said energy efficiency coefficients comprising functions of coefficients of performance and supply heat indexes of the data center;
receiving a request to perform a workload;
comparing the available resources in the data centers with resources for performing the workload;
determining which of the data centers contains adequate available resources to perform the workload; and
using the computer processor to select the data center containing adequate resources and having the highest energy efficiency coefficient to perform the workload, wherein the computer processor is configured to select the data center having the highest energy efficiency coefficient; and
placing the workload on the selected data center.

39. The computer readable storage medium according to claim 38, said one or more computer programs further comprising a set of instructions for:
detecting one or more environmental conditions inside and outside of the data centers and calculating the supply heat indexes based upon the detected one or more environmental conditions.

40. The computer readable storage medium according to claim 38, said one or more computer programs further comprising a set of instructions for:
determining which of the data centers contains appropriate types of resources to perform the workload, sufficient amounts of resources to perform the workload, sufficient amounts of resource instances to perform the workload, and are not subject to restrictions which would prevent the data centers from performing the workload.

41. The computer readable storage medium according to claim 38, said one or more computer programs further comprising a set of instructions for:
calculating the supply heat indexes of the data centers;
determining the coefficients of performance of the data centers; and
calculating energy efficiency coefficients of the data centers based upon the supply heat indexes and the coefficients of performance.

42. The computer readable storage medium according to claim 38, said one or more computer programs further comprising a set of instructions for:
calculating energy efficiency coefficients (χ) of each data center (i) through the following equation:

$$\chi_i = \xi_i \frac{1}{\tau} \int COP_i(t) dt, \text{ where:}$$

$\xi_i$=1/SHI, of the ith data center and where SHI is the supply heat index of the ith data center;

$$COP_i = \frac{Q_{evap}}{W_c},$$

where COP is the coefficient of performance of the ith data center, $Q_{evap}$ is the desired heat output of the data center and $W_c$ is the work input;

τ is a duration in which the application is to be scheduled; and t is the time of day in which the application is to be scheduled, and wherein the step of selecting a data center further comprises selecting the data center having the highest energy efficiency coefficient.

43. The computer readable storage medium according to claim 42, said one or more computer programs further comprising a set of instructions for:
calculating the energy efficiency coefficients (χ) with a modified COP, said modified COP being a ratio of power consumption of the resources in a data center over the power consumption of an air conditioning unit in the data center.

44. The computer readable storage medium according to claim 38, said one or more computer programs further comprising a set of instructions for:

calculating energy efficiency coefficients of the data centers based upon anticipated thermal characteristics of the data centers if the workload were performed by the data centers; and wherein the step of selecting a data center further comprises selecting the data center having the highest energy efficiency coefficient while performing the workload.

45. The computer readable storage medium according to claim 38, said one or more computer programs further comprising a set of instructions for:

performing the steps of receiving a request to perform a workload and receiving the information from the information service, comparing the available resources in the data centers with resources required to perform the workload and determining which of the data centers contains adequate resources to perform the workload, in a broker.

46. The computer readable storage medium according to claim 38, said one or more computer programs further comprising a set of instructions for:

performing the steps of receiving a request to perform a workload and receiving the information from the information service, and selecting one of the data centers to perform the workload based upon energy efficiency characteristics of the data centers, in a co-allocator.

* * * * *

UNITED STATES PATENT AND TRADEMARK OFFICE
CERTIFICATE OF CORRECTION

PATENT NO. : 7,197,433 B2  Page 1 of 3
APPLICATION NO. : 10/820786
DATED : March 27, 2007
INVENTOR(S) : Chandrakant D. Patel et al.

It is certified that error appears in the above-identified patent and that said Letters Patent is hereby corrected as shown below:

In column 9, lines 3-4, in Equation 3, delete " $SHI = \frac{T_{rackinlet} - T_{ref}}{T_{rackoutlet} - T_{ref}}$ " and insert -- $SHI = \frac{\bar{T}_{rackinlet} - T_{ref}}{\bar{T}_{rackoutlet} - T_{ref}}$ --, therefor.

In column 11, line 7, delete "524c" and insert -- 254c --, therefor.

In column 12, line 50, delete "40 C" and insert -- 40° C --, therefor.

In column 12, line 51, delete "20 C" and insert -- 20° C --, therefor.

In column 12, line 52, delete "10 C" and insert -- 10° C --, therefor.

In column 12, line 55, delete "50 C" and insert -- 50° C --, therefor.

In column 12, line 55, delete "30 C" and insert -- 30° C --, therefor.

In column 13, line 2, delete "30 C" and insert -- 30° C --, therefor.

In column 13, lines 2-3, delete "15 C" and insert -- 15° C --, therefor.

In column 13, line 57, after "set" insert -- point. However, if the RH levels are below the predetermined set point, the CRAC unit 114 may attempt to humidify the cooling fluid delivered to the components 122. In this situation, because the humidification process also requires additional power consumption by the CRAC unit 114, the modified COP will, therefore, be affected by the humidification process as well. The modified COP may thus be used in place of the COP described hereinabove with respect to the determination of the energy efficiency coefficient ($\chi$). In addition, the co-allocator 224 may select the data center 252a-252c having the highest energy efficiency coefficient ($\chi$) based upon the modified COP to perform the requested application 258.

According to another example, a penalty factor may be included in the determination of the energy efficiency coefficients ($\chi$) of the data centers 252a-252c. The penalty factor may substantially be based upon the RH levels around the data centers 252a-252c. Thus, for instance, if the RH level is higher than a predetermined setpoint, a dehumidifier of a CRAC unit 114 may be in operation. If the dehumidifier is in operation, a penalty factor may be included in the determination of the COP for that data center 252a-252c. By way of example, the co-allocator 224 may decide to withdraw any data centers 252a-252c from consideration in determining whether to allocate the application in that data center 252a-252c, if the penalty factor is detected.

Alternatively, the penalty factor may be assigned according to the level of dehumidifier (or humidifier) operation in the data center 252a-252c. Thus, for instance, values may be assigned to various levels of dehumidifier (or humidifier) activity, which may correlate to the penalty factors of the data centers 252a-252c having dehumidifiers that are operating. In this example, a larger penalty factor may be assigned to those data centers 252a-252c having higher levels of dehumidifier or humidifier activity. The penalty factors may, for instance, be subtracted from or otherwise reduce the COP of the data centers 252a-252c for which the dehumidifiers are operating. In addition, the levels to which the COPs are reduced may be based upon the dehumidification (or humidification) levels. In this regard, the energy efficiency coefficients ($\chi$) of the data centers 252a-252c having the reduced levels of COP will be lower than for those data centers 252a-252c having COPs which are not reduced due to dehumidification (or humidification) operations. --.

In column 15, lines 17-62, delete "is point. However, if the RH levels are below the predetermined set .................................................................. reduced due to dehumidification (or humidification) operations. configured" and insert -- is configured --, therefor.

In column 18, line 3, delete "154c" and insert -- 254c --, therefor.

In column 18, line 5, delete "HP addresses" and insert -- IP addresses --, therefor.

In column 20, line 67, delete "WPL" and insert -- WPI --, therefor.

In column 22, line 50, in Claim 1, delete "efficient" and insert -- efficiency --, therefor.

In column 22, line 61, in Claim 4, after "occurring" insert -- in --.

In column 22, line 63, in Claim 4, delete "beat" and insert -- heat --, therefor.

In column 23, line 3, in Claim 6, delete "arid" and insert -- and --, therefor.

In column 24, line 34, in Claim 19, delete "the" before "workload".

In column 24, line 46, in Claim 20, delete "(GRAMS)" and insert -- (GRAMs) --, therefor.

In column 25, line 22, in Claim 25, delete "coefficient" and insert -- coefficients --, therefor.

In column 25, line 25, in Claim 25, delete "," before "based".

In column 26, line 10, in Claim 29, after "information" insert -- , --.

CERTIFICATE OF CORRECTION (continued)
U.S. Pat. No. 7,197,433 B2

In column 26, lines 20-21, in Claim 30, after "information" insert -- , --.

In column 26, line 31, in Claim 31, after "centers" insert -- , --.

In column 27, line 32, in Claim 35, delete "the for" and insert -- the means for --, therefor.

In column 27, line 55, in Claim 38, delete "center" and insert -- centers --, therefor.

Signed and Sealed this

Ninth Day of February, 2010

David J. Kappos
*Director of the United States Patent and Trademark Office*